United States Patent [19]
Matsuo et al.

[11] Patent Number: 6,164,677
[45] Date of Patent: Dec. 26, 2000

[54] BICYCLE ANTITHEFT CONTROL DEVICE, SHIFTING DEVICE AND SHIFTING SYSTEM

[75] Inventors: Nobuyuki Matsuo; Hiroyuki Ookouchi, both of Shimonoseki; Hitoshi Kishimoto; Takuro Yamane, both of Sakai, all of Japan

[73] Assignee: Shimano, Inc., Osaka, Japan

[21] Appl. No.: 09/457,644

[22] Filed: Dec. 7, 1999

Related U.S. Application Data

[62] Division of application No. 08/993,684, Dec. 18, 1997.

[30] Foreign Application Priority Data

Dec. 20, 1996 [JP] Japan .................................. 8-342077
Dec. 20, 1996 [JP] Japan .................................. 8-342078
Mar. 11, 1997 [JP] Japan .................................. 9-056623
Mar. 18, 1997 [JP] Japan .................................. 9-065024
Jul. 25, 1997 [JP] Japan .................................. 9-199590

[51] Int. Cl.⁷ ...................................................... B62H 5/10
[52] U.S. Cl. ........................... 280/297; 280/288.4; 70/233
[58] Field of Search ............................. 340/65, 427, 542, 340/63; 280/297, 288.4; 70/233

[56] References Cited

U.S. PATENT DOCUMENTS 3,673,562  6/1972  Buell .......................................... 340/63
3,721,956  3/1973  Hamann et al. .......................... 340/65

(List continued on next page.)

FOREIGN PATENT DOCUMENTS

| | | |
|---|---|---|
| 477707 | 12/1947 | Belgium . |
| 899123 | 7/1984 | Belgium . |
| 450897 | 7/1936 | European Pat. Off. . |
| 443217 A1 | 8/1991 | European Pat. Off. . |
| 841243 A1 | 5/1998 | European Pat. Off. . |
| 881114 | 4/1943 | France . |
| 1132662 | 3/1957 | France . |
| 1171110 | 1/1959 | France . |
| 2267921 | 11/1975 | France . |
| 2751293 | 1/1998 | France . |
| 3541169 | 7/1986 | Germany . |
| 19621679 A1 | 12/1996 | Germany . |
| 56-64892 | 5/1981 | Japan . |
| 4-271985 | 9/1992 | Japan . |
| 7-17445 | 1/1995 | Japan . |
| 10-119852 | 5/1998 | Japan . |
| 10-203440 | 8/1998 | Japan . |
| 10-230877 | 9/1998 | Japan . |
| 11-20759 | 1/1999 | Japan . |
| 276646 | 7/1951 | Switzerland . |
| WO93/01964 | 4/1993 | WIPO . |
| 95/03206 | 2/1995 | WIPO . |

OTHER PUBLICATIONS

Patent Abstracts of Japan, vol. 1995, vol. 1995, No. 2, Mar. 31, 1995, for JP 6–305463, published Nov. 1, 1994.
Derwent Abstract 1076–B2167X, 1976.

*Primary Examiner*—Khoi Q. Ta
*Attorney, Agent, or Firm*—James A. Deland

[57] ABSTRACT

A bicycle antitheft device includes an antitheft mechanism switchable between an antitheft state and a release state, wherein the antitheft mechanism includes a first member that moves relative to a second member to move the bicycle forward and backward. A movement controlling mechanism hinders the first member from moving relative to the second member when the antitheft mechanism is in the antitheft state, and a selection mechanism is provided for selecting one of the antitheft state and the release state. Alternatively, the antitheft mechanism may include a sound generator for generating a sound when the first member moves relative to the second member and the antitheft mechanism is in the antitheft state. The movement controlling mechanism and the sound generator may be combined into a single antitheft mechanism. The movement controlling mechanism and/or sound generator may be installed inside of an internal transmission such as a hub or crank transmission, or they could be installed inside a handlebar control for the transmission.

14 Claims, 26 Drawing Sheets

U.S. PATENT DOCUMENTS

| | | | |
|---|---|---|---|
| 3,789,634 | 2/1974 | Brown | 70/186 |
| 3,855,825 | 12/1974 | Pickard | 70/14 |
| 4,024,741 | 5/1977 | Arblaster | 70/233 |
| 4,379,281 | 4/1983 | Thomas | 340/63 |
| 4,444,407 | 4/1984 | Calmonte et al. | 280/297 |
| 4,621,873 | 11/1986 | Weinstein et al. | 301/124 R |
| 4,663,611 | 5/1987 | Humphrey | 340/542 |
| 4,854,191 | 8/1989 | Nagano | 74/750 B |
| 5,027,628 | 7/1991 | De Rocher et al. | 70/233 |
| 5,157,954 | 10/1992 | Pietras | 70/227 |
| 5,226,846 | 7/1993 | Onori | 446/404 |
| 5,270,681 | 12/1993 | Jack | 340/427 |
| 5,291,763 | 3/1994 | Cuisinot | 70/201 |
| 5,312,166 | 5/1994 | Nagano | 301/110.5 |
| 5,534,847 | 7/1996 | McGregor | 340/432 |
| 5,540,456 | 7/1996 | Meier-Burkamp et al. | 280/236 |
| 5,598,727 | 2/1997 | White | 40/233 |
| 5,611,558 | 3/1997 | Randmae | 280/288.4 |
| 5,628,214 | 5/1997 | Evers | 70/227 |
| 5,815,069 | 9/1998 | Horton | 340/427 |
| 5,821,856 | 10/1998 | Lace | 340/568 |
| 5,900,705 | 5/1999 | Kimura | 318/286 |
| 5,992,192 | 11/1999 | Tual et al. | 70/233 |

BICYCLE ANTITHEFT CONTROL DEVICE, SHIFTING DEVICE AND SHIFTING SYSTEM

CROSS REFERENCE TO RELATED APPLICATIONS

This application is a division of copending application number 08/993,684, filed Dec. 18, 1997.

BACKGROUND OF THE INVENTION

The present invention is directed to bicycle accessories and, more particularly, to an antitheft control device for a bicycle.

Bicycles, particularly recreational bicycles referred to as city cruisers, are inexpensive and are easy to ride, and are thus widely used to commute to work or school. This type of recreational bicycle is sometimes equipped with an internal gear shifter to ride at high speeds over flat terrain or to ride uphill with minimal exertion. Such internal gear shifters commonly use planet reduction mechanisms, which are compactly housed in the wheel hub.

Unfortunately, such recreational bicycles are often stolen from bike stands or the like in front of train stations, not out of any particular ill will, but as a kind of "quick borrow." Bicycles which are obviously equipped with internal gear shifters are a particular target of such thefts. To prevent this type of theft, bicycle locks such as box-shaped locks and horseshoe-shaped locks are attached to the front or back fork to lock the wheel. However, the simple structure of bicycle locks makes them easy to unlock and remove. Two bicycle locks are thus sometimes attached to the front and back forks. For example, a box-shaped lock is attached to the front fork, and a horseshoe-shaped lock or chain lock is attached to the back fork. When two bicycle locks are used, there is less of a probability of theft because it is more trouble for a potential thief to unlock and take off two locks than just one. On the other hand, it is a nuisance for the owner to lock and unlock them. Similarly, when a rider is in a hurry, it is a burden to lock two locks. And even when two locks are used, bicycles can still be pedaled away and stolen by unlocking and taking off the locks.

SUMMARY OF THE INVENTION

The present invention is directed to an antitheft device for a bicycle wherein the antitheft device can be easily activated or deactivated by the owner while also being very difficult for a thief to defeat. In one embodiment of the present invention, a bicycle antitheft device includes an antitheft mechanism switchable between an antitheft state and a release state, wherein the antitheft mechanism includes a first member that moves relative to a second member to move the bicycle forward and backward. A movement controlling mechanism hinders the first member from moving relative to the second member when the antitheft mechanism is in the antitheft state, and a selection mechanism is provided for selecting one of the antitheft state and the release state. Alternatively, the antitheft mechanism may include a sound generator for generating a sound when the first member moves relative to the second member and the antitheft mechanism is in the antitheft state. Furthermore, if desired, the movement controlling mechanism and the sound generator may be combined into a single antitheft mechanism. The movement controlling mechanism and/or sound generator may be installed inside of an internal transmission such as a hub or crank transmission, or they could be installed inside a handlebar control for the transmission.

DETAILED DESCRIPTION OF THE EMBODIMENTS

Figure 1:
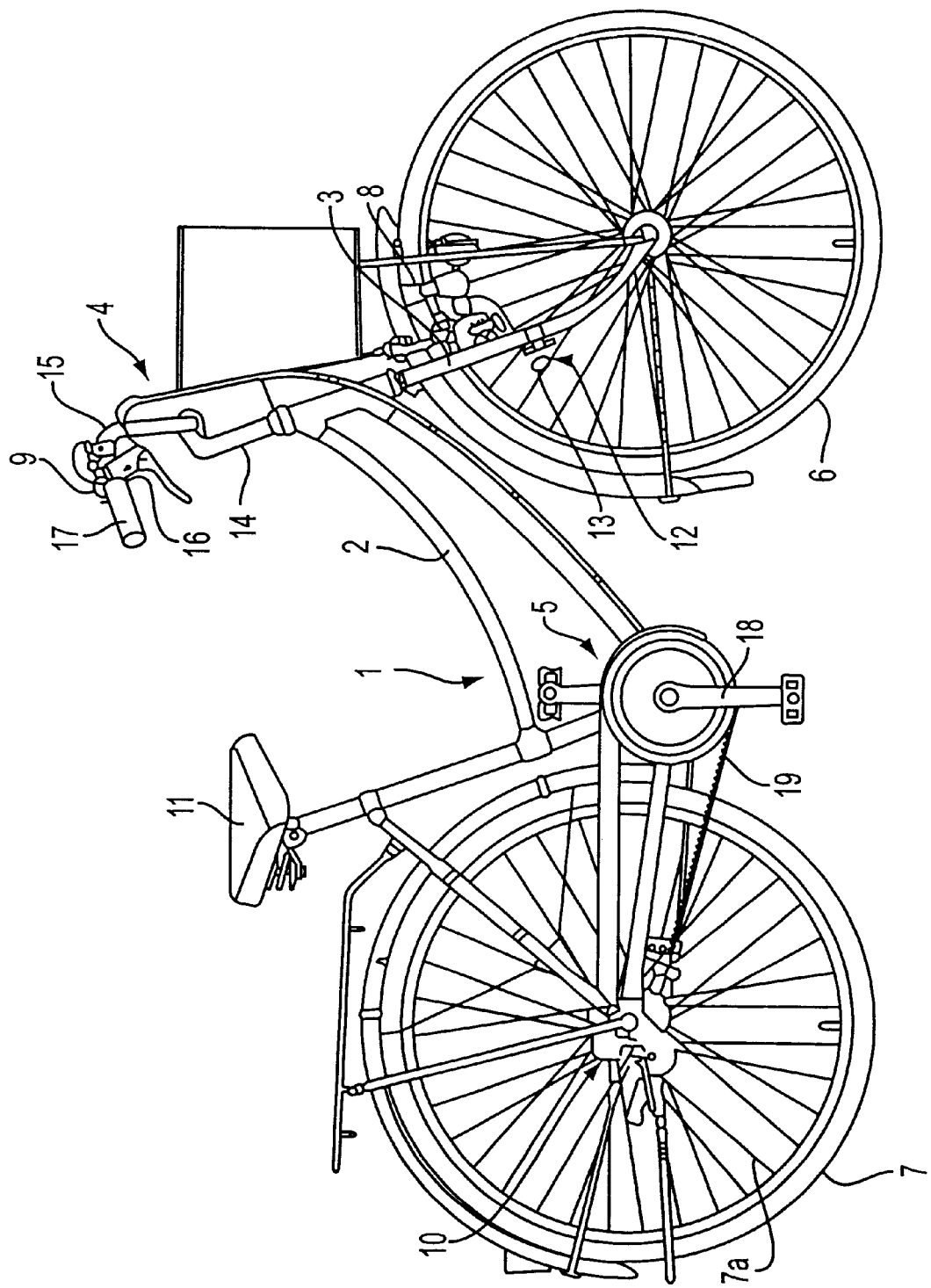
FIG. 1 is a side view of a bicycle in which a particular embodiment of an antitheft device according to the present invention may be employed.

FIG. 1 is a side view of a bicycle in which a particular embodiment of an antitheft device according to the present invention may be employed. The bicycle includes a frame 1 with a double-loop type of frame unit 2 and a front fork 3; a handle component 4; a drive component 5; a front wheel 6; a rear wheel 7 in which a four-speed internal shifting hub 10 is mounted; front and rear brake devices 8 (only the front brake device is shown in figure); and a shift control element 9 for conveniently operating the internal shifting hub 10. The drive component 5 has a gear crank 18 that is provided to the lower portion (bottom bracket portion) of the frame body 2, a chain 19 that is wrapped around the gear crank 18, and the internal gear hub 10.

Various components, including a saddle 11 and a handle component 4, are attached to the frame 1. A bicycle speed sensor 12 furnished with a bicycle speed sensing lead switch is mounted on the front fork 3. This bicycle speed sensor 12 outputs a bicycle speed signal by detecting a magnet 13 mounted on the front wheel 6. The handle component 4 has a handle stem 14 that is fixed to the upper portion of the front fork 3 and a handlebar 15 that is fixed to the handle stem 14. Brake levers 16 and grips 17 which constitute part of the brake devices 8 are mounted at either end of the handlebar 15. A shift control element 9 is mounted on the right-side brake lever 16.

Figure 2:
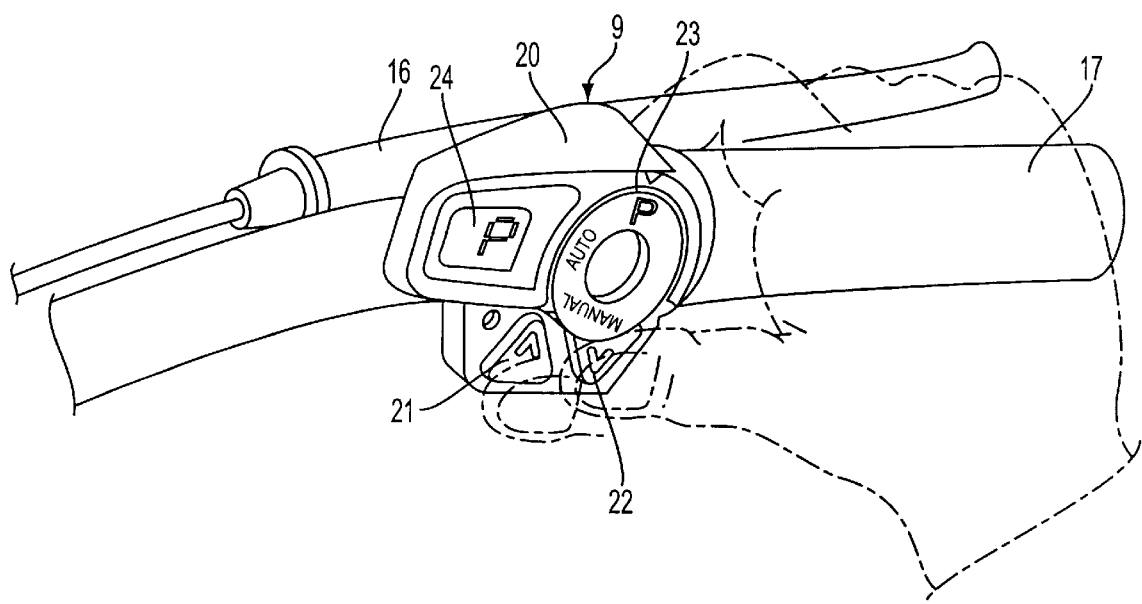
FIG. 2 is an oblique view of a particular embodiment of a handlebar control mechanism used with an antitheft device according to the present invention.

As shown in FIG. 2, the shift control element 9 has a control panel 20 formed integrally with the right-side (front-wheel) brake lever 16, two control buttons 21 and 22 disposed next to each other to the left and right on the lower portion of the control panel 20, a control dial 23 disposed above the control buttons 21 and 22, and a liquid-crystal display component 24 disposed to the left of the control dial 23. The current riding speed is displayed on the liquid-crystal display component 24, as is the speed step selected at the time of the shift.

The control buttons 21 and 22 are triangular push buttons. The control button 21 on the left side is used to perform shifts to a higher speed step, while the control button 22 on the right side is used to perform shifts to a lower speed step.

The control dial 23 is used to switch among two shifting modes and a parking mode (P), and it has three stationary positions: P A, and M. Here, the shift mode comprises an automatic shift (A) mode and a manual shift (M) mode. The automatic shift mode is for automatically shifting the internal shifting hub 10 by means of a bicycle speed signal from the bicycle speed sensor 12, and the manual shift mode is for shifting the internal shifting hub 10 through the operation of the control buttons 21 and 22. The parking mode is for locking the internal shifting hub 10 and controlling the rotation of the rear wheel 7.

Figure 3:
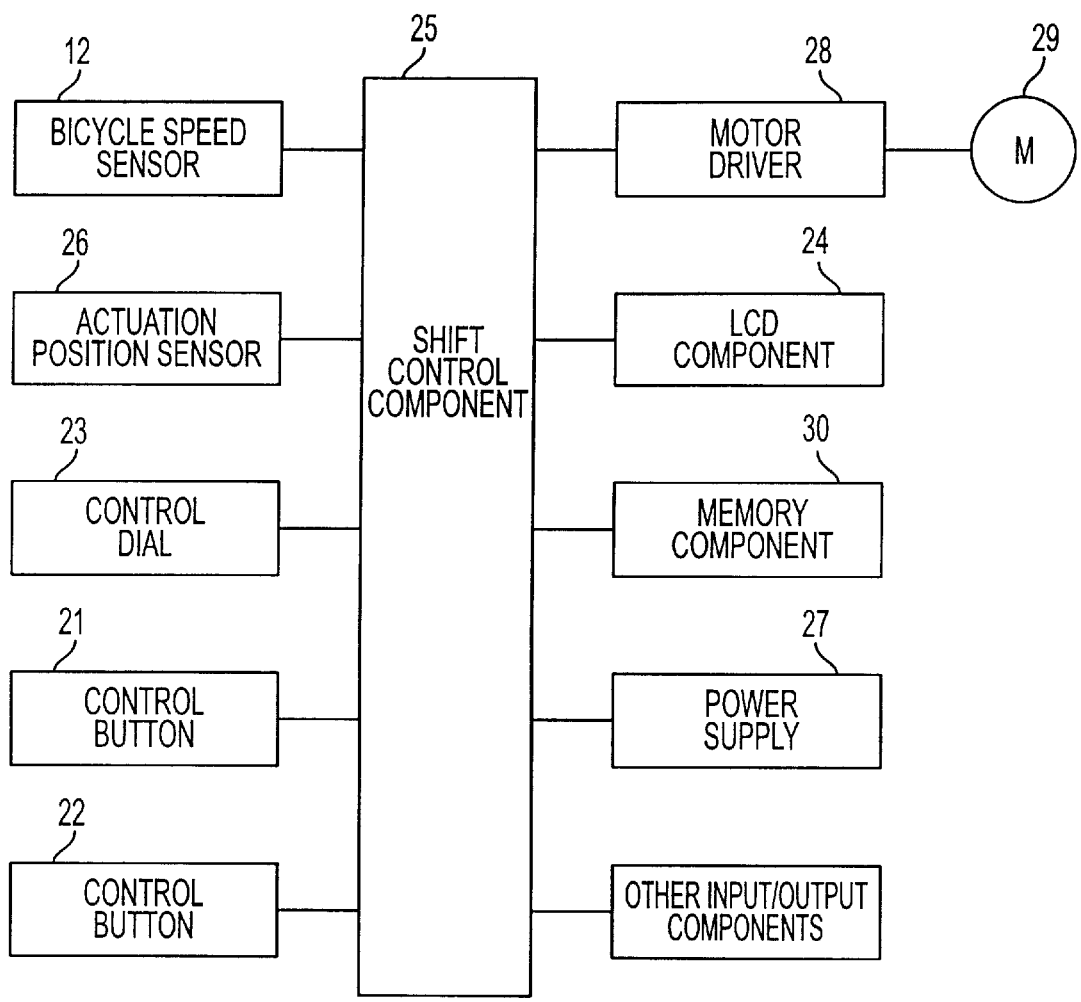
FIG. 3 is a block diagram of a particular embodiment of an electronic control mechanism that may be used with the antitheft control device according to the present invention.

A shift control component 25 (FIG. 3) that is used to control shifting is housed inside the control panel 20. The shift control component 25 comprises a microcomputer consisting of a CPU, a RAM, a ROM, and an I/O interface. As shown in FIG. 3, the shift control component 25 is connected to the bicycle speed sensor 12, an actuation position sensor 26 composed of a potentiometer (for example, a potentiometer that senses the actuation position of the internal shifting hub 10), the control dial 23, and the control buttons 21 and 22. The shift control component 25 is also connected to a power supply 27 (consisting of a battery), a motor driver 28, the liquid-crystal display component 24, a memory component 30, and another input/output component. A shift motor 29 is connected to the motor driver 28. Various types of data, such as the password (PW) discussed below or the tire diameter, are stored in the memory component 30. The relation between the speed step and the speed during the automatic shift mode is also stored. The shift control component 25 controls the motor 29 according to the various modes, and also controls the display of the liquid-crystal display component 24.

Figure 4:
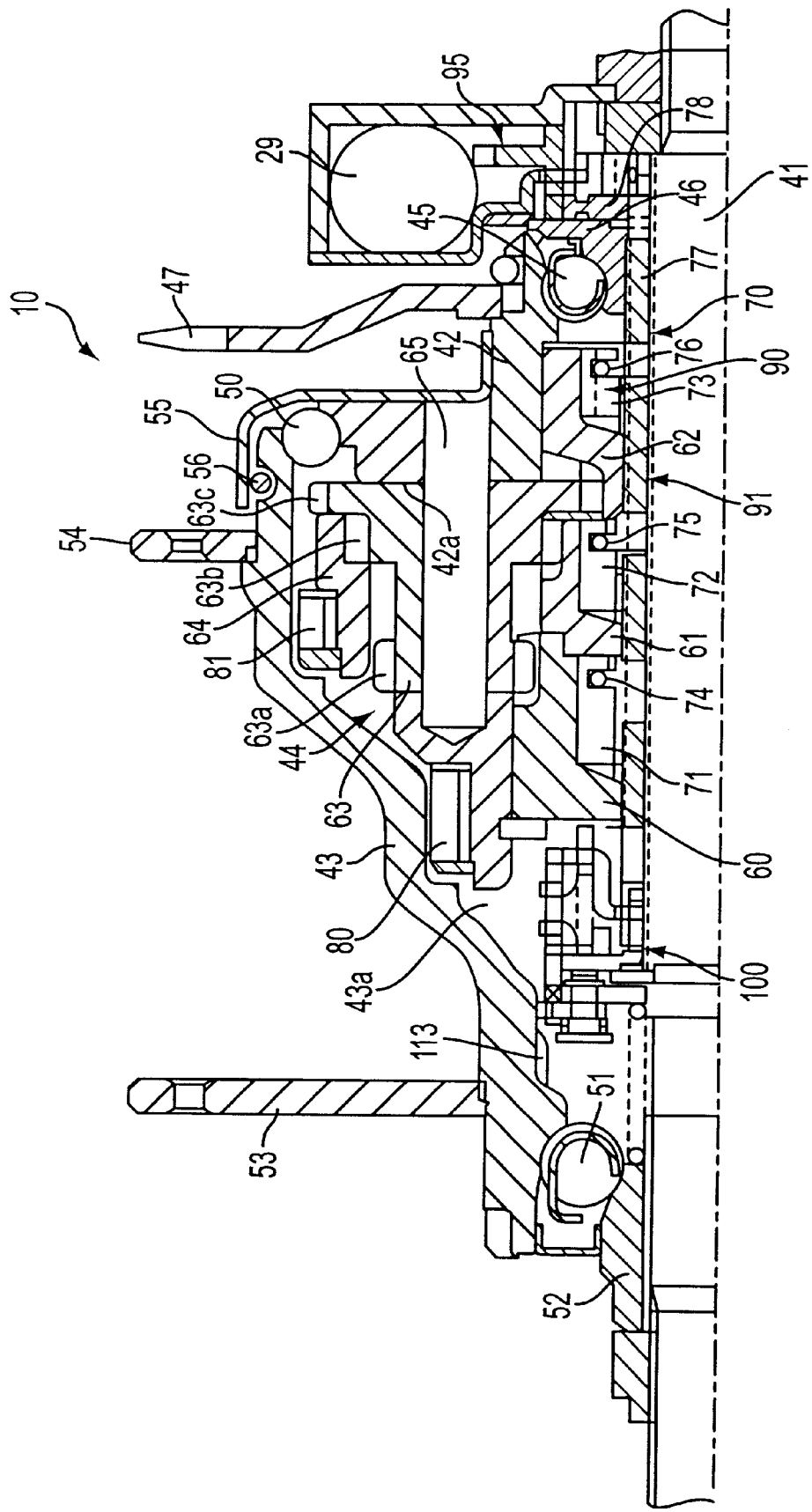
FIG. 4 is a partial cross sectional view of a bicycle hub transmission that incorporates a particular embodiment of an antitheft device according to the present invention.

As shown in FIG. 4, the internal gear hub 10 primarily has a hub axle 41 that is fixed to the rear portion of the bicycle frame 1, a driver 42 that is located around the outer periphery at one end of the hub axle 41, a hub shell 43 that is located around the outer periphery of the hub axle 41 and driver 42, a planet gear mechanism 44 for transmitting motive power between the driver 42 and the hub shell 43, and a sound-generating mechanism 100 for antitheft purposes. The planet gear mechanism 44 is made up of a total of four steps, one direct and three speed-increasing.

The driver 42 is a roughly cylindrical member, one end of which is rotatably supported by the hub axle 41 via balls 45 and a hub cone 46. A hub cog 47 is fixed as an input element around the outer periphery at one end. A notch 42a that expands outward in the radial direction from the space in the center is formed in the driver 42. Three of these notches 42a are formed at roughly equal angles in the circumferential direction.

The hub shell 43 is a cylindrical member having a plurality of steps in the axial direction, and the driver 42 is housed in a housing space 43a around the inner periphery thereof. One side of the hub shell 43 is rotatably supported around the outer periphery of the driver 42 via balls 50, and the other by the hub axle 41 via balls 51 and a hub cone 52. Flanges 53 and 54 for supporting the spokes 7a (FIG. 1) of the rear wheel 7 are fixed around the outer periphery at both ends of the hub shell 43. A cover 55 is fixed to the outer side wall at one side of the driver 42, and the distal end of the cover 55 extends so as to cover the outer peripheral surface at one end of the hub shell 43. A sealing member 56 is positioned between the inner peripheral surface at the distal end of the cover 55, and the outer peripheral surface of the hub shell 43.

The planet gear mechanism 44 is housed in the housing space 43a inside the hub shell 43, and has first, second, and third sun gears 60, 61, and 62, three planet gears 63(*a–c*) (only one planet gear is shown in the figures) that mesh with these, and a ring gear 64. The sun gears 60 to 62 are lined up in the axial direction around the inner periphery of the driver 42 and the outer periphery of the hub axle 41, and furthermore are allowed to rotate relative to the hub axle 41. The planet gears 63 are rotatably supported via a support pin 65 within the notches 42*a* in the driver 42. A first gear 63*a*, a second first gear 63*b*, and a third gear 63*c* are formed integrally with the planet gears 63. The first gear 63*a* meshes with the first sun gear 60, the second gear 63*b* meshes with the second sun gear 61, and the third gear 63*c* meshes with the third sun gear 62. The ring gear 64 is located on the outer peripheral side of the planet gears 63, and inner teeth are formed around the inner periphery. This ring gear 64 meshes with the second gear 63*b* of the planet gears 63.

Figure 5:
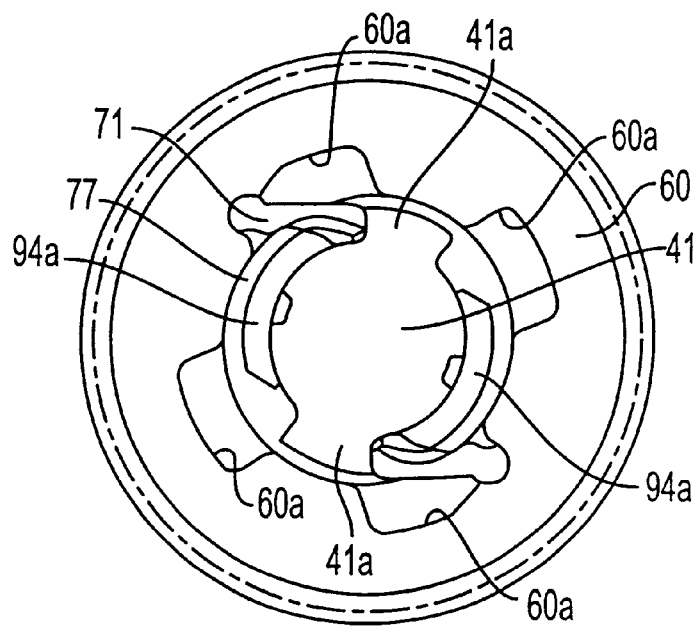
FIG. 5 is a diagram showing the relationship between a first sun gear and drive pawls when the hub transmission shown in FIG. 4 is in a fourth gear.
Figure 6:
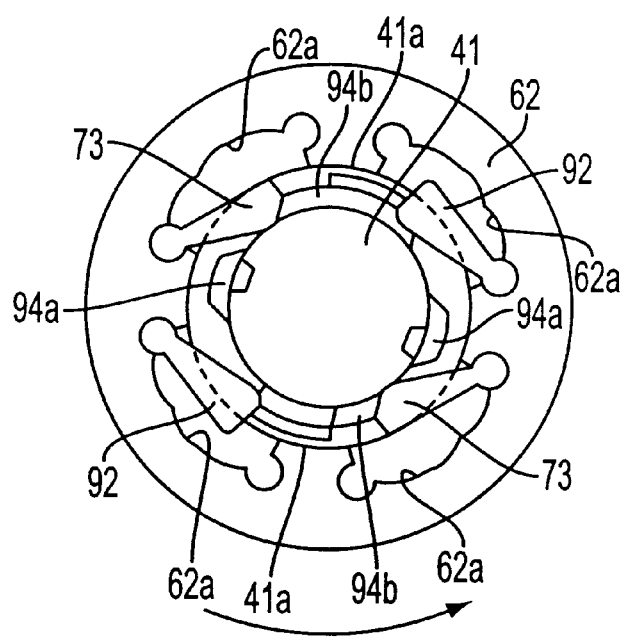
FIG. 6 is a diagram showing the relationship between lock pawls, drive pawls and a third sun gear when the hub transmission shown in FIG. 4 is in the fourth gear.
Figure 7:
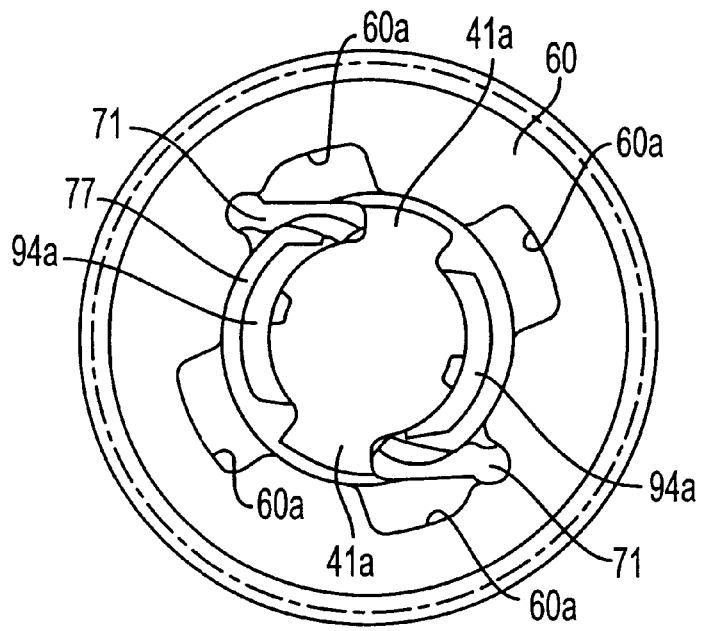
FIG. 7 is a diagram showing the relationship between a first sun gear and drive pawls when the hub transmission shown in FIG. 4 is in a locked state.
Figure 8:
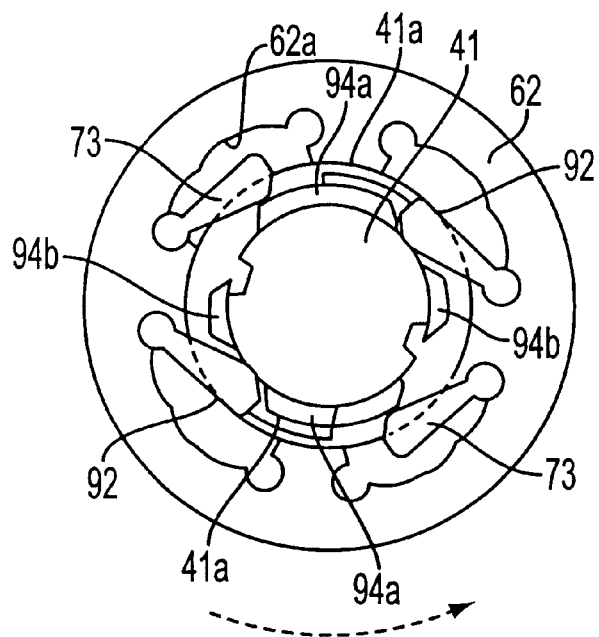
FIG. 8 is a diagram showing the relationship between lock pawls, drive pawls and a third sun gear when the hub transmission shown in FIG. 4 is in the locked state.

As shown in FIGS. 5 to 8, a pair of stopping protrusions 41*a* are formed at the locations where the sun gears 60 to 62 are disposed. Four housing spaces 60*a* to 62*a* are formed apart from each other in the peripheral direction around the inner periphery of the sun gears 60 to 62. The first sun gear 60 is depicted in FIGS. 5 and 7, whereas the third sun gear 62 is depicted in FIGS. 6 and 8. Between the hub axle 41 and the inner periphery of the sun gears 60 to 62 are positioned a selective clutch mechanism 70 for preventing the sun gears 60 to 62 from performing relative rotation in the forward direction or for allowing them to rotate relative to the hub axle 41, a lock mechanism 90 for preventing the third sun gear 62 from performing relative rotation in the opposite direction from the forward direction or for allowing it to perform relative rotation, and an actuation mechanism 91 for actuating the selective clutch mechanism 70 and the lock mechanism 90. These actuation mechanism 91, lock mechanism 90, and sound-generating mechanism 100 constitute an antitheft device.

The selective clutch mechanism 70 has a function whereby it selectively links one of the three sun gears 60 to 62 to the hub axle 41, and a function whereby it does not link any of the sun gears 60 to 62 to the hub axle 41. The selective clutch mechanism 70 has a plurality of drive pawls 71, 72, and 73 that are disposed in the housing spaces 60*a* to 62*a* of the sun gears 60 to 62, and the distal ends of which are able to mesh with the stopping protrusions 41*a* of the hub axle 41, and has annular wire springs 74, 75, and 76 for energizing the distal ends of the drive pawls 71 to 73 toward the hub axle 41. The drive pawls 71 to 73 are swingably supported at their base ends in the pawl housing spaces 60*a* to 62*a* where they face each other, and are able to mesh at their distal ends with the stopping protrusions 41*a*. When the drive pawls 71 to 73 are stopped by the stopping protrusions 41*a* of the hub axle 41 and thereby linked to the hub axle 41, the sun gears 60 to 62 are no longer able to rotate in the forward direction (clockwise in FIG. 5) in relation to the hub axle 41 but can perform relative rotation in the opposite direction (counterclockwise in FIG. 5). When the drive pawls are released, relative rotation is possible in both directions.

The lock mechanism 90, as shown in FIG. 6, has a pair of lock pawls 92 which are capable of meshing at their distal ends with the stopping protrusions 41*a* of the hub axle 41 at the inner surface of the third sun gear 62 and which are positioned in the pawl housing space 62*a* of the third sun gear 62. The distal ends of the lock pawls 92 are energized toward the hub axle 41 by the wire spring 76 that energizes the drive pawls 73. The lock pawls 92 are swingably supported at their base ends in another pawl housing space 62*a* opposite from the pawl housing space 62*a* in which the drive pawl 73 is housed, and they are capable of meshing at their distal ends with the stopping protrusions 41*a* on the opposite side from the drive pawls 73. When the lock pawls 92 are stopped by the stopping protrusions 41*a* of the hub axle 41 and thereby linked to the hub axle 41, the third sun gear 62 is no longer able to rotate relatively in the opposite direction from the forward direction (counterclockwise in FIG. 6), but is able to rotate relatively in the forward direction (clockwise in FIG. 6). When the lock pawls are released, relative rotation is possible in both directions.

The actuation mechanism 91 has a sleeve 77. The sleeve 77 is rotatably fitted over the outer periphery of the hub axle 41, and has a plurality of drive cam components 94*a* and lock cam components 94*b* at the locations where the drive pawls 71 to 73 and the lock pawls 92 are disposed on the outer periphery. When these drive cam components 94*a* strike any of the drive pawls 71 to 73, and the lock cam components 94*b* strike lock pawls 92, the struck pawls are raised, and the linkage between the hub axle 41 and the sun gears 60 to 62 is released by these pawls. An operator 78 is fixed to one end of the sleeve 77, and the sleeve 77 can be rotated by the rotation of the operator 78. The rotation of the sleeve 77 then causes the cam components 94 to selectively actuate the drive pawls 71 to 73 and the lock pawls 92, so that the linkage and locking of the sun gears 60 to 62 with the hub axle 41 are controlled.

As shown in FIG. 4, a reduction mechanism 95 is linked to the operator 78. The reduction mechanism 95 reduces the speed of rotation of the shift motor 29, and transmits rotation to the operator 78. The actuation position sensor 26, which is used to fix the sleeve 77 of the internal shifting hub 10 in one of the actuation positions VP (in one of the shift positions V1 to V4 of the speed steps or in the locked position PK), is disposed inside the reduction mechanism 95.

With a structure such as this, a large speed-increasing power transmission path with the largest speed increasing ratio is created when the drive pawl 71 strikes a stopping protrusion 41*a* of the hub axle 41, and the first sun gear 60 is selected; a medium speed-increasing power transmission path with the second-largest speed increasing ratio is created when the second sun gear 61 is selected; and a small speed-increasing power transmission path with the smallest speed increasing ratio is created when the third sun gear 62 is selected. If none of the sun gears has been selected, then a direct-coupled power transmission path is created. Also, when the lock pawls 92 strike the stopping protrusions 41*a* of the hub axle 41, rotation of the third sun gear 62 is locked in the opposite direction from the forward direction, and when another sun gear (such as the first sun gear 60) is linked with the hub axle 41 by the drive pawls, the internal shifting hub 10 is locked.

A first one-way clutch 80 is provided between the inner peripheral surface of the hub shell 43 and the outer peripheral surface at the other end of the driver 42. A second one-way clutch 81 is provided between the inner peripheral surface of the hub shell 43 and the outer peripheral surface of the ring gear 64. These one-way clutches 80 and 81 are both roller-type, one-way clutches, which reduces noise during idle running when a shift is made, softens the shock when a shift is made, and allows for smoother shifting.

Figure 9:
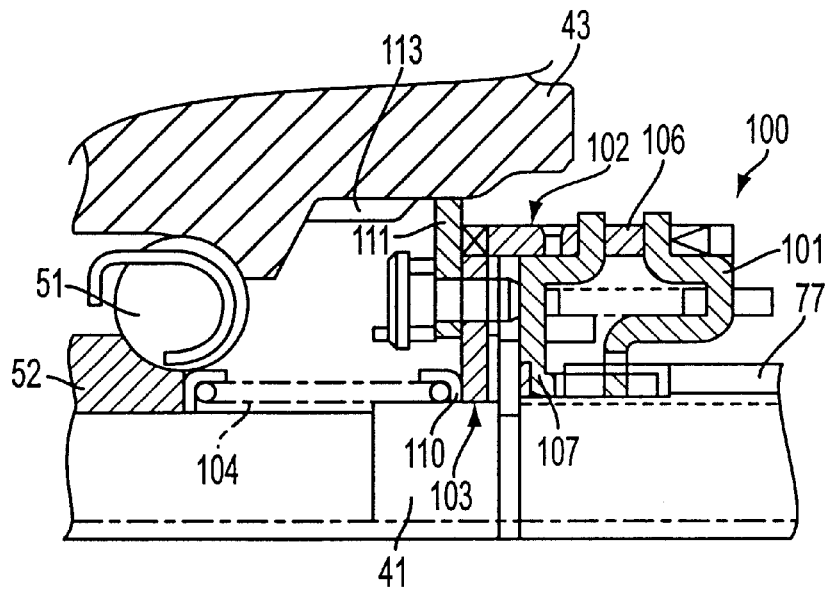
FIG. 9 is a detailed cross-sectional view of a particular embodiment of a sound generating mechanism according to the present invention when the bicycle is in motion.
Figure 10:
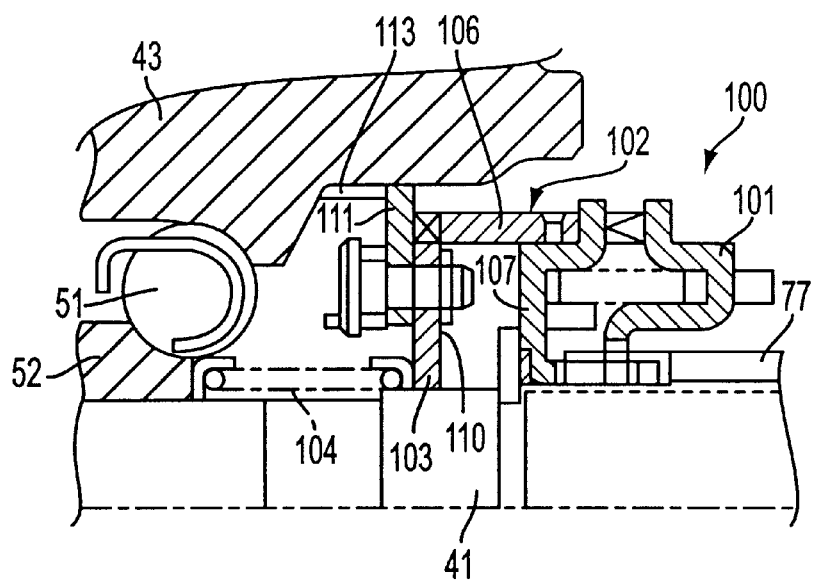
FIG. 10 is a detailed cross-sectional view of the antitheft device shown in FIG. 9 when the bicycle is in a locked state.
Figure 11A:
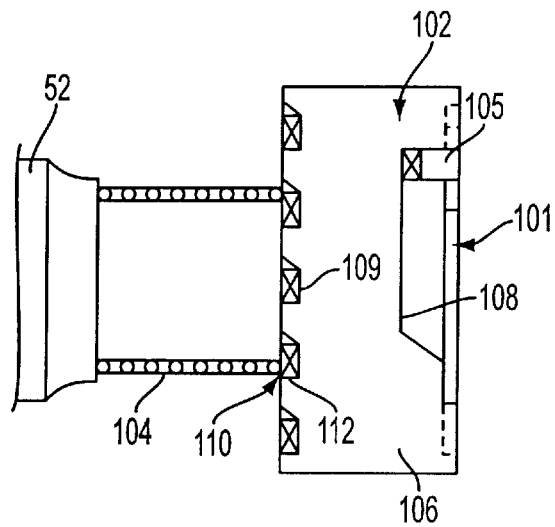
FIGS. 11(a)–11(c) are views showing the operation of the antitheft device of FIG. 9;.
Figure 11B:
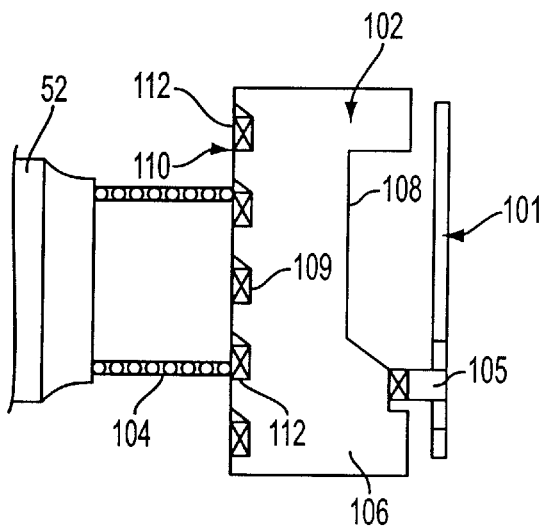
Figure 11C:
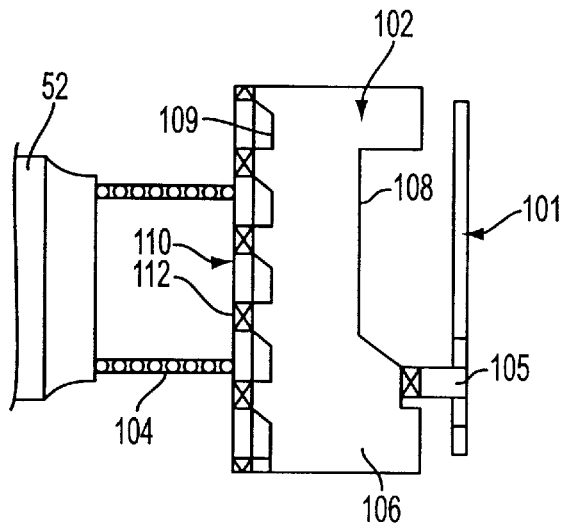

The sound-generating mechanism 100 is provided to the left end (in FIG. 4) of the hub axle 41 within the hub shell 43. As shown in FIGS. 9 to 11, the sound-generating mechanism 100. has a spring washer 101 that rotates integrally with the sleeve 77, a noise-emitting cam 102 positioned on the hub axle 41 such that it is able to move in the axial direction but unable to rotate, a noise-emitting washer 103 that presses against the noise-emitting cam 102, and a noise-emitting spring 104 disposed in a compressed state between the noise-emitting washer 103 and the hub cone 52.

The spring washer 101 is a member that is nonrotatably stopped by the sleeve 77, and it has around its outer periphery an engagement tab 105 that strikes the noise-emitting cam 102. The noise-emitting cam 102 has a cylindrical cam body 106 and a stopping washer 107 that stops the cam body 106 and the hub axle 41 such that they can move in the axial direction but cannot rotate. A cam component 108 that strikes the engagement tab 105 is formed at the right end (in FIG. 11) of the cam body 106. The cam component 108 is formed such that the cam body 106 is moved axially to the left by the rotation of the sleeve 77 toward the locked position PK. A large number of noise-emitting grooves 109 are formed at regular intervals in the circumferential direction at the left end of the cam body 106. The noise-emitting grooves 109 are inclined in the forward direction.

The noise-emitting washer 103 has a disk-shaped washer body 110 and a ratchet pawl 111 that is swingably supported on the washer body 110. Numerous noise-emitting tabs 112 that engage with the noise-emitting grooves 109 are formed around the outer periphery of the washer body 110. The ratchet pawl 111 is able to mesh with ratchet teeth 113 formed in the inner peripheral surface of the hub shell 43 when the hub shell 43 rotates in the forward direction. This sound-generating mechanism 100 emits noise through the vibration of the noise-emitting washer 103 when the sleeve 77 is in the locked position and when the rear wheel 7 rotates in the forward direction.

Figure 12:
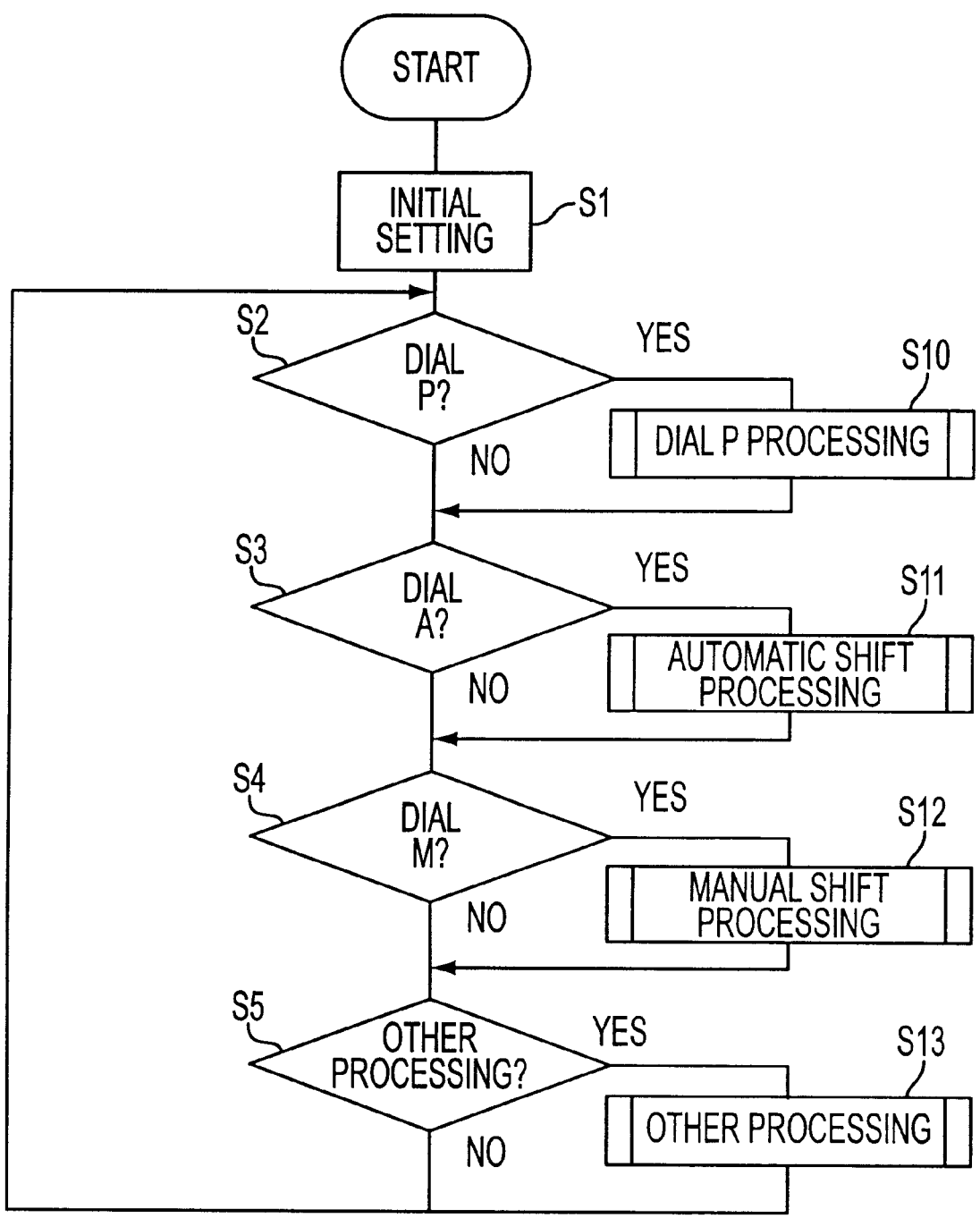
FIG. 12 is a flow chart of a particular embodiment of a main routine for shift processing in a shift control device that incorporates an antitheft device according to the present invention.

Shifting and locking are performed by actuating the shift motor 29 through mode selection with the control dial 23 of the shift control element 9, through shift operation with the control buttons 21 and 22, and through rotating the sleeve 77 via the operator 78. FIG. 12 is a flow chart illustrating the actuation and control of the shift control component 25.

When the power is turned on, initialization is performed in step S1. Here, circumference data used for calculating speed is set to a diameter of 26 inches, and the speed step is set to second gear (V2). In step S2, a decision is made as to whether the control dial 23 has been set to the parking mode. In step S3, a decision is made as to whether the control dial 23 has been set to the automatic shift mode. In step S4, a decision is made as to whether the control dial 23 has been set to the manual shift mode. In step S5, a decision is made as to whether some other processing, such as tire diameter input, has been selected.

Figure 13:
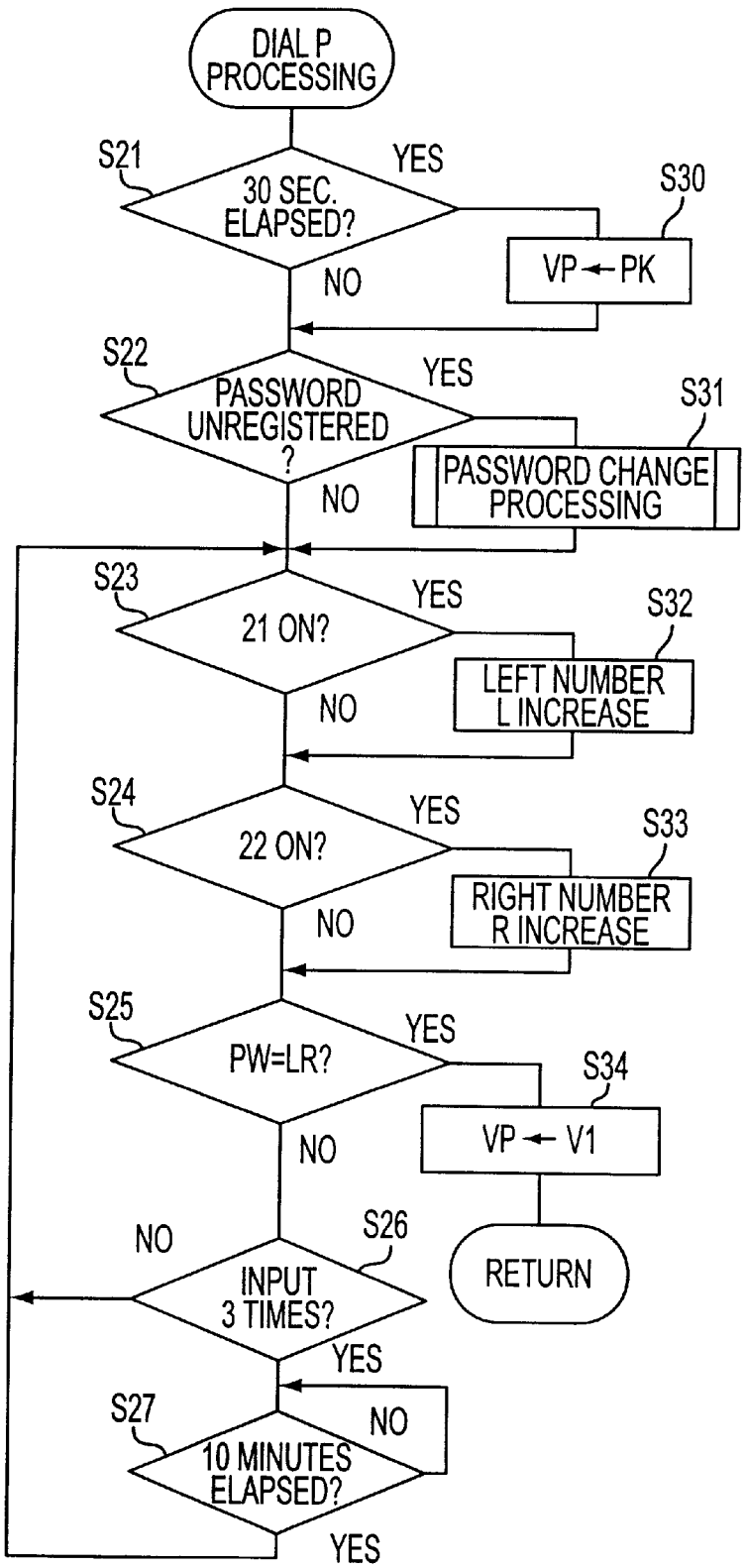
FIG. 13 is a flow chart showing overall password processing in a shift control device that incorporates an antitheft device according to the present invention.
Figure 15:
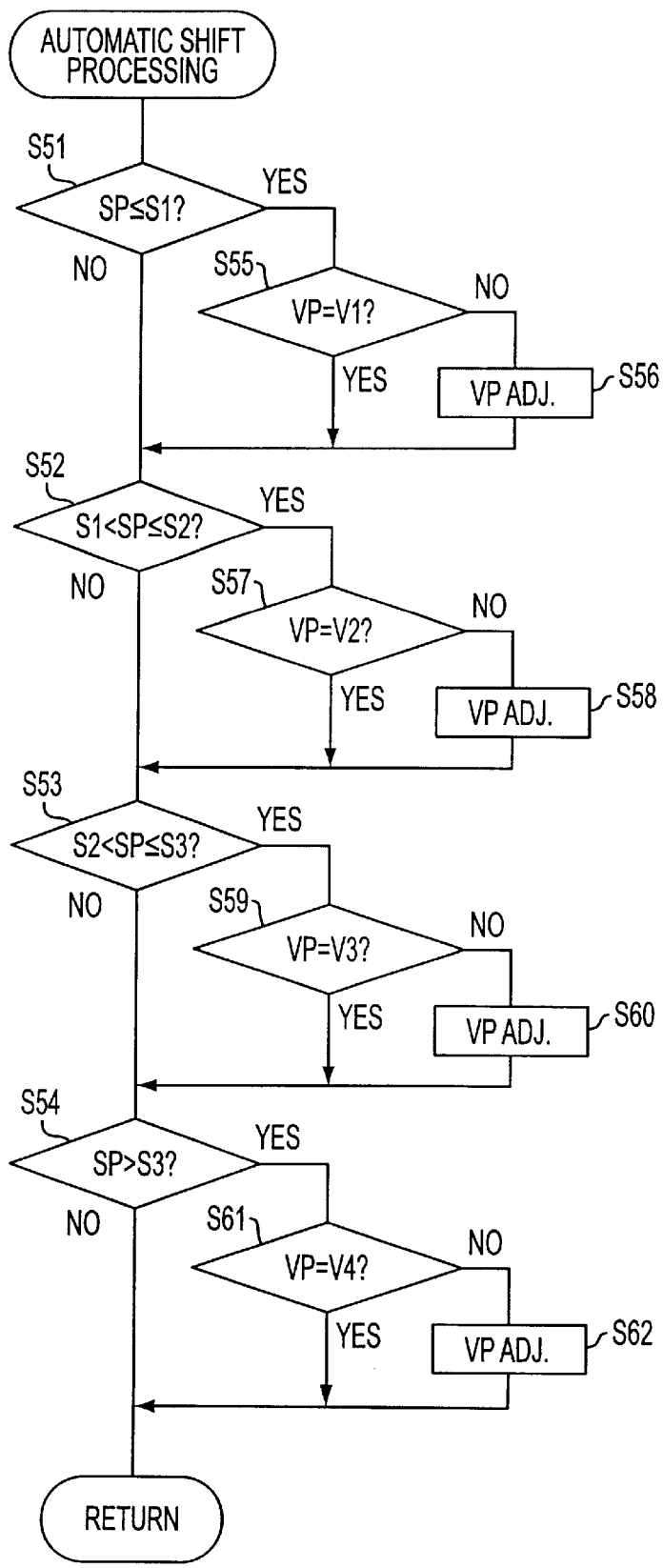
FIG. 15 is a flow chart showing automatic shift processing in a shift control device that incorporates an antitheft device according to the present invention.
Figure 16:
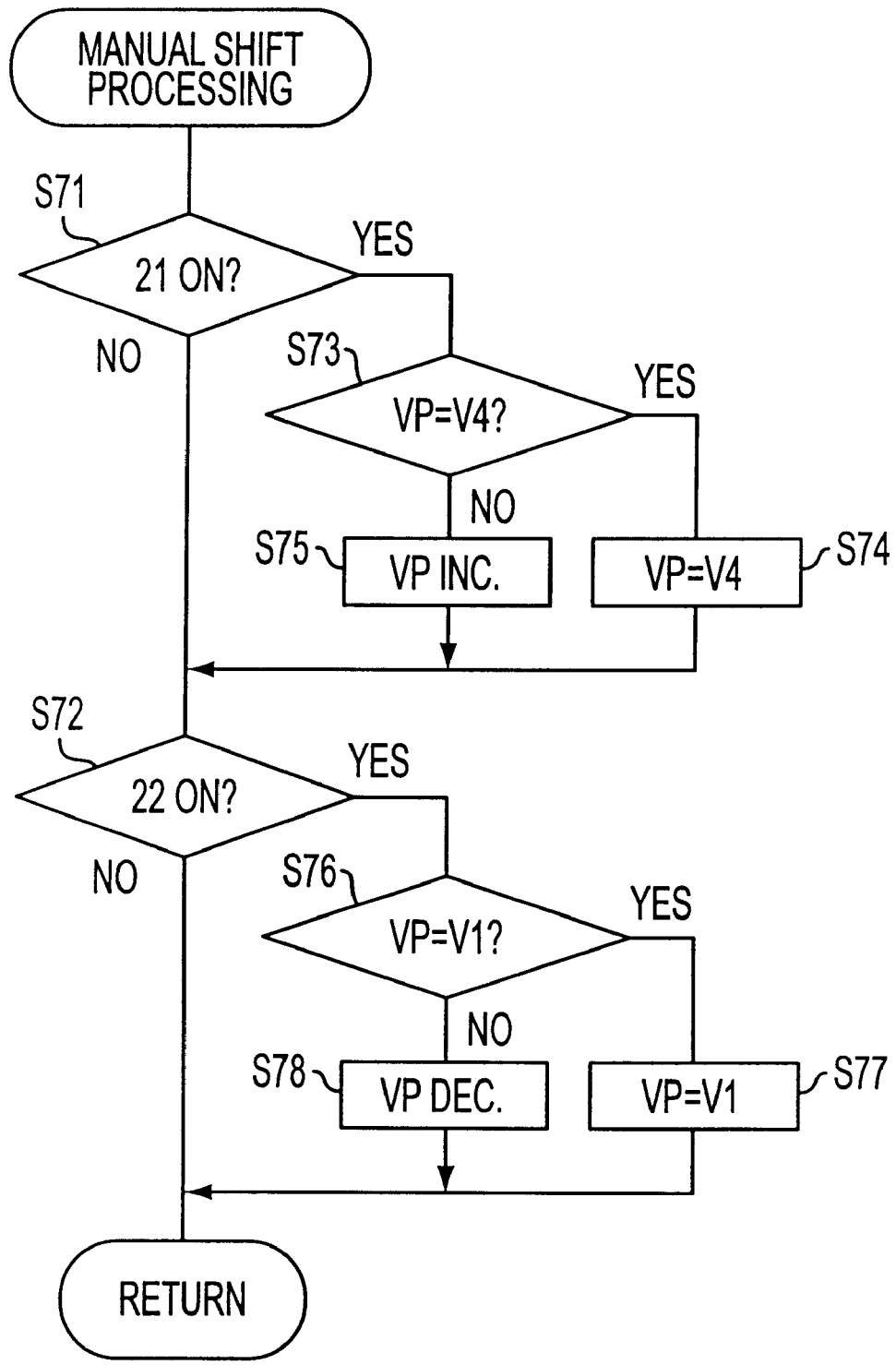
FIG. 16 is a flow chart showing manual shift processing in a shift control device that incorporates an antitheft device according to the present invention.

When the control dial 23 is turned to position P and set to the parking mode, the flow goes from step S2 to step S10. In step S10, the dial P processing shown in FIG. 13 is executed. When the control dial 23 is turned to position A and set to the automatic shift mode, the flow goes from step S3 to step S11. In step S11, the automatic shift processing shown in FIG. 15 is executed. When the control dial 23 is turned to position M and set to the manual shift mode, the flow goes from step S4 to step S12. In step S12, the manual shift processing shown in FIG. 16 is executed. When other processing is selected, the flow goes from step S5 to step S13, and the selected processing is executed.

With the dial P processing in step S10, a decision is made as to whether 30 seconds has elapsed since the dial was turned to position P in step S21 in FIG. 13. In step S22, a decision is made as to whether the password PW has been registered. This decision is made on the basis of whether the password PW has already been stored in the memory component 30. If the password has already been registered, the flow moves on to step S23.

In step S23 a decision is made as to whether the left control button 21 has been operated. The purpose of operating the control buttons 21 and 22 here is to input the password for unlocking the locked internal shifting hub 10. In step S24 a decision is made as to whether the right control button 22 has been operated. In step S25 a decision is made as to whether the password LR inputted by operation of the two control buttons 21 and 22 matches the registered password PW. If there is no match, the flow moves on to step S26. In step S26 a decision is made as to whether the password still does not match after it has been inputted three times. If it has yet to be inputted three times, the flow returns to step S23, and the re-inputting of the password is permitted. If the password does not match the registered password PW after three inputs, the flow moves on to step S27. In step S27, the system waits for 10 minutes to pass, and when 10 minutes have elapsed, the flow returns to step S23, and the re-inputting of the password is permitted.

Once 30 seconds have elapsed since the dial was turned to the P position, the flow moves from step S21 to step S30. In step S30, the shift motor 29 is driven by the motor driver 28, and the actuation position VP is set to the locked position PK. As a result, the sleeve 77 is rotated via the operator 78, the drive pawl 71 is raised as shown in FIGS. 7 and 8 so that the first sun gear 60 and the hub axle 41 are locked in just the forward direction, and the lock pawls 92 are raised so that the third sun gear 62 and the hub axle 41 are nonrotatably locked in the opposite direction from the forward direction. When the two sun gears 60 and 62 are thus locked, if an attempt is made to rotate the driver 42 by rotating the crank gear 18, the system will try to make the largest upshift since the first sun gear 60 is locked in the forward direction, but since the third sun gear 62 cannot turn backward, the planet gear mechanism 44 is locked and cannot move. Accordingly, the bicycle cannot be pedaled away, making its theft more difficult.

If the bicycle is pushed by hand at this point, the one-way clutch 80 will allow it to move forward even if the planet gear mechanism 44 is locked. If, however, the sleeve 77 is rotated to the locked position PK, the cam body 106 of the sound-generating mechanism 100 will be pressed by the engagement tab 105 of the spring washer 101 that rotates along with the sleeve 77, and will move from the position indicated by (A) in FIGS. 9 and 11 to the positions indicated by (B) and (C) in FIGS. 10 and 11 (that is, will move to the left in the axial direction). As a result, the ratchet pawl 111 of the noise-emitting washer 103 meshes with the ratchet teeth 113 of the hub shell 43, and rotates integrally with the hub shell 43 only in the forward direction. At this point, the noise-emitting tabs 112 of the noise-emitting washer 103 go in and out of the noise-emitting grooves 109 of the noise-emitting cam 102, creating a loud impact sound. Consequently, a loud noise is produced when the bicycle is pushed by hand in a locked state, and this also deters theft.

Figure 14:
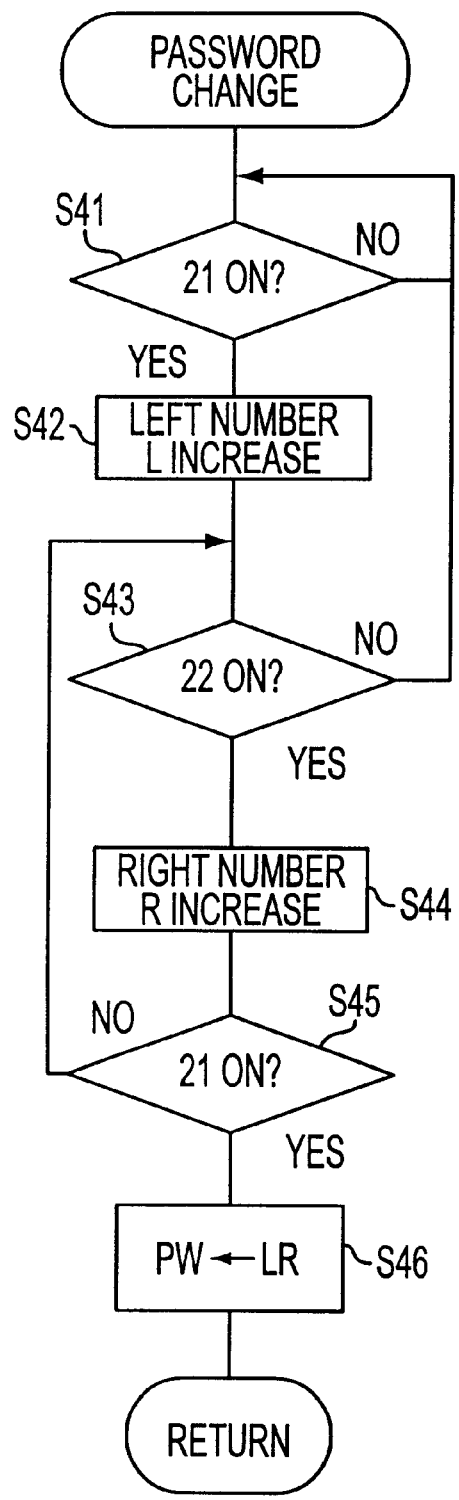
FIG. 14 is a flow chart showing password registration processing in a shift control device that incorporates an antitheft device according to the present invention.

If the password PW has not been registered, the flow moves from step S22 to step S31. In step S31, the code registration processing illustrated in FIG. 14 is executed. Here, a decision is made as to whether the control button 21 was operated in step S41 in FIG. 14. If the control button 21 was operated, the flow moves to step S42, and the left number L (a 10-digit number) is increased by one. In step S43 a decision is made as to whether the control button 22 was operated. The flow returns to step S41 until the control button 22 is pushed, and the left number L is increased by one. When the control button 22 is operated, the flow moves to step S44, and the right number R (a 1-digit number) is increased by one. In step S45 a decision is made as to whether the control button 21 was operated again. The flow returns to step S43 until the control button 21 is operated, and the right number R is increased by one. When the control button 21 is operated, the flow moves to step S46, and the inputted number LR is stored as the password PW in the memory component 30. A password PW is thus registered after being selected from among 100 two-digit numbers LR ranging from "00" to "99."

In step S23, if it is decided that the control button 21 was operated during unlocking, the flow moves on to step S32. In step S32 the left number L is increased by one, just as when the password was registered. If it is decided that the control button 22 was operated, the flow moves from step S24 to step S33. In step S32, the right number R is increased by one, just as when the password was registered. If the inputted number LR matches the password PW in step S25, the flow moves to step S34, and the actuation position VP is set to first gear V1. As a result, the sleeve 77 is rotated by the shift motor 29 and positioned at the first gear V1, the lock pawl 92 of the third sun gear 62 comes out, and all of the drive pawls 71 to 73 come out. This means that all of the sun gears 60 to 62 are free to rotate with respect to the hub axle 41. As a result, when the bicycle is pedaled, the rotation of the driver 42 is transmitted directly to the hub shell 43 via the first one-way clutch 80.

With the automatic shift processing of step S11, the actuation position VP is set to a speed step corresponding to the bicycle speed SP. When the position is different from this, shifts are made one gear at a time toward this. Here, in step S51 in FIG. 15, a decision is made as to whether the bicycle speed SP is at or below the speed S1 on the basis of the speed signal from the bicycle speed sensor 12. In step S52 a decision is made as to whether the bicycle speed SP is over the speed S1 and at or below the speed S2. In step S53 a decision is made as to whether the bicycle speed SP is over the speed S2 and at or below the speed S3. In step S54 a decision is made as to whether the bicycle speed SP is over the speed S3.

When the bicycle speed SP is low (at or below the speed S1), the flow moves from step S51 to step S55. In step S55 a decision is made as to whether the current actuation position VP is first gear V1. If the actuation position VP is not first gear V1, the flow moves on to step S56, and the actuation position VP is adjusted to first gear V1 one speed step at a time. If the bicycle speed SP is medium low (over the speed S1 and at or below the speed S2), the flow moves from step S52 to step S57. In step S57 a decision is made as to whether the current actuation position VP is second gear V2. If the actuation position VP is not second gear V2, the flow moves on to step S58, and the actuation position VP is adjusted to second gear V2 one speed step at a time. If the bicycle speed SP is medium high (over the speed S2 and at or below the speed S3), the flow moves from step S53 to step S59. In step S59 a decision is made as to whether the current actuation position VP is third gear V3. If the actuation position VP is not third gear V3, the flow moves on to step S60, and the actuation position VP is adjusted to third gear V3 one speed step at a time. If the bicycle speed SP is high (over the speed S3), the flow moves from step S54 to step S61. In step S61 a decision is made as to whether the current actuation position VP is fourth gear V4. If the actuation position VP is not fourth gear V4, the flow moves on to step S62, and the actuation position VP is adjusted to fourth gear V4 one speed step at a time.

Here, when the first sun gear 60 and the hub axle 41 are linked by the shift motor 29, the bicycle is in fourth gear V4, the rotation inputted from the chain wheel to the driver 42 is increased by the largest gear ratio determined by the number of teeth on the first sun gear 60, the first gear 63a and second gear 63b of the planet gears 63, and the ring gear 64, and this rotation is transmitted to the hub shell 43 via the second one-way clutch 81. When the second sun gear 61 is selected and linked to the hub axle 41, the bicycle is in third gear V3, the rotation of the driver 42 is increased by a medium (the second largest) gear ratio determined by the number of teeth on the second sun gear 61, the second gear 63b of the planet gears 63, and the ring gear 64, and this rotation is transmitted to the hub shell 43 via the second one-way clutch 81. When the third sun gear 62 is selected and linked to the hub axle 41, the bicycle is in second gear V2, the rotation of the driver 42 is increased by the smallest gear ratio determined by the number of teeth on the third sun gear 62, the second gear 63b and third gear 63c of the planet gears 63, and the ring gear 64, and this rotation is transmitted to the hub shell 43 via the second one-way clutch 81. If none of the sun gears 60 through 62 is selected, first gear V1 is engaged, and the rotation of the driver 42 is transmitted directly to the hub shell 43, as above. Unselected sun gears perform relative rotation in the opposite direction from the forward direction with respect to the hub axle 41. When any one of the sun gears is selected and speed is stepped up by the planet gear mechanism 44, the driver 42 and the hub shell 43 perform relative rotation in the direction in which meshing with the first one-way clutch 80 is released.

With the manual shift processing of step S11, gear shifts are made one at a time by operation of the control buttons 21 and 22. In step S71 in FIG. 16 a decision is made as to whether the control button 21 was operated. In step S72 a decision is made as to whether the control button 22 was operated. When the control button 21 is operated, the flow moves from step S71 to step S73. In step S73 a decision is made as to whether the current actuation position VP is fourth gear V4. If the current actuation position VP is fourth gear V4, the flow moves on to step S74, and fourth gear V4 is maintained without a shift being made. If the current actuation position VP is not fourth gear V4, then the flow moves to step S75, and the actuation position VP is moved one speed step higher. When the control button 22 is operated, the flow moves from step S71 to step S73. In step S73 a decision is made as to whether current actuation position VP is first gear V1. If the current actuation position VP is first gear V1, the flow moves on to step S77, and first gear V1 is maintained without a shift being made. If the current actuation position VP is not first gear V1, the flow moves to step S78, and the actuation position VP is moved one speed step lower. During these shifts, the sensing results from the actuation position sensor 26 are compared with the positional data for each actuation position stored ahead of time in the memory component 30, the results of which are used to perform positioning control of the shift motor 29.

Thus, according to this embodiment, entering the parking mode with the aid of the control dial 23 allows this mode to be maintained as long as the entered password does not match the registered password, and hence impedes the unlocking of the antitheft device containing the lock mechanism 90. In addition, entering the parking mode with the aid of the control dial 23 allows the planetary gear mechanism 44 to be locked by the lock mechanism 90 and the sound-generating mechanism 100 to produce a sound, making it impossible for an unauthorized person to pedal the bicycle away and generating a sound when the bicycle is pushed. This arrangement can minimize bicycle theft.

In the above-described embodiment, a lock mechanism 90 was provided between a hub axle 41 and a sun gear 62 that performed relative rotation, and a sound-generating mechanism 100 was separately provided between the hub axle 41 and the hub shell 43 to prevent theft. It is also possible, however, to position an antitheft device 85 endowed with sound-generating and locking functions between the hub axle 41 and the hub shell 43, that is, to provide the device to a running component that performs relative rotation as shown in FIG. 17.

Figure 17:
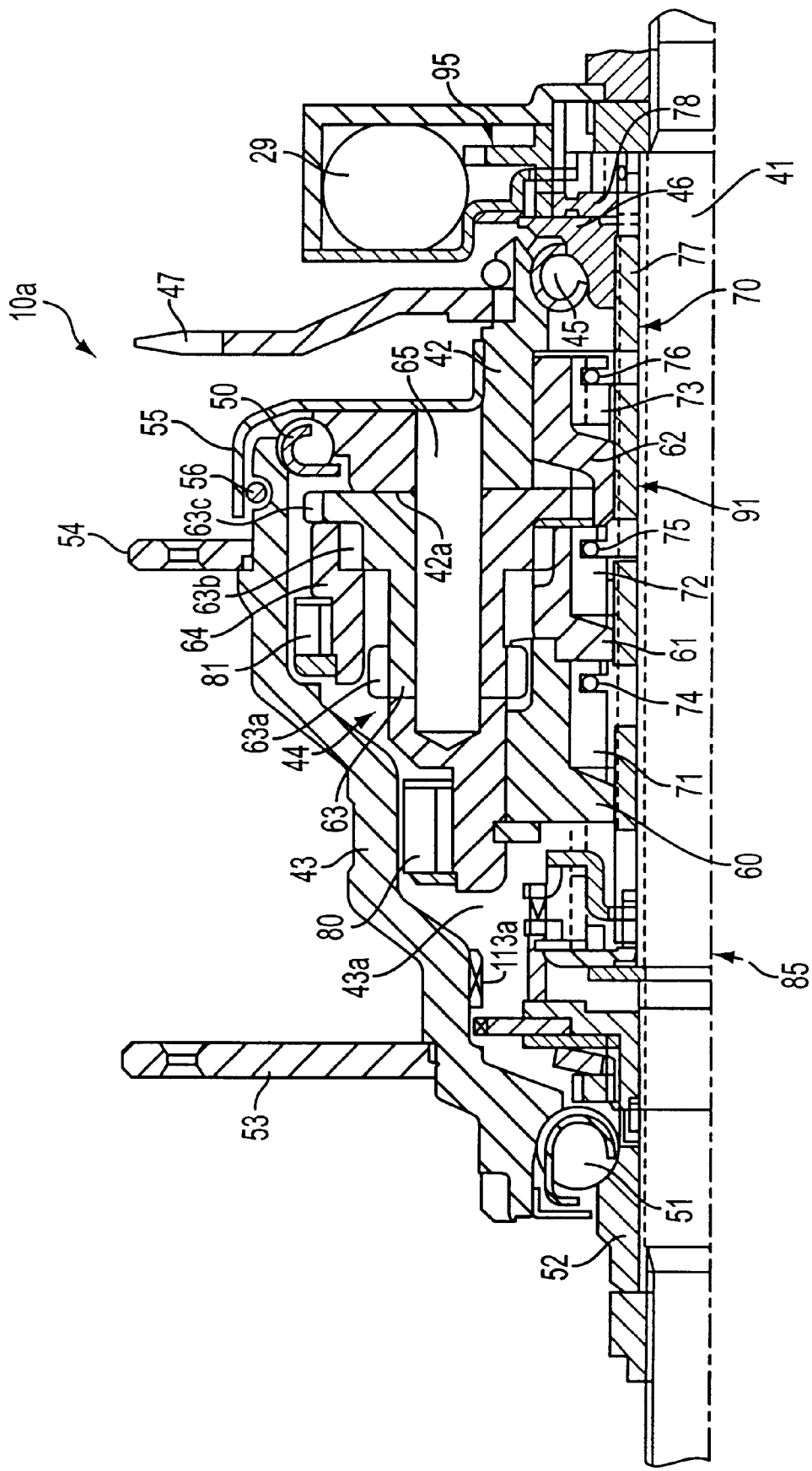
FIG. 17 is a partial cross sectional view of a bicycle hub transmission that incorporates an alternative embodiment of an antitheft device according to the present invention.

As shown in FIG. 17, an internal shifting hub 10a has an antitheft device 85 in which the sound-generating mechanism 100 in FIG. 4 is endowed with a locking function in addition to a sound-generating function. The sun gear 62 is therefore devoid of any lock pawls. Except for the presence of the antitheft device 85, this embodiment has the same structure and operation as embodiment shown in FIG. 4, and the corresponding description will therefore be omitted.

Figure 18:
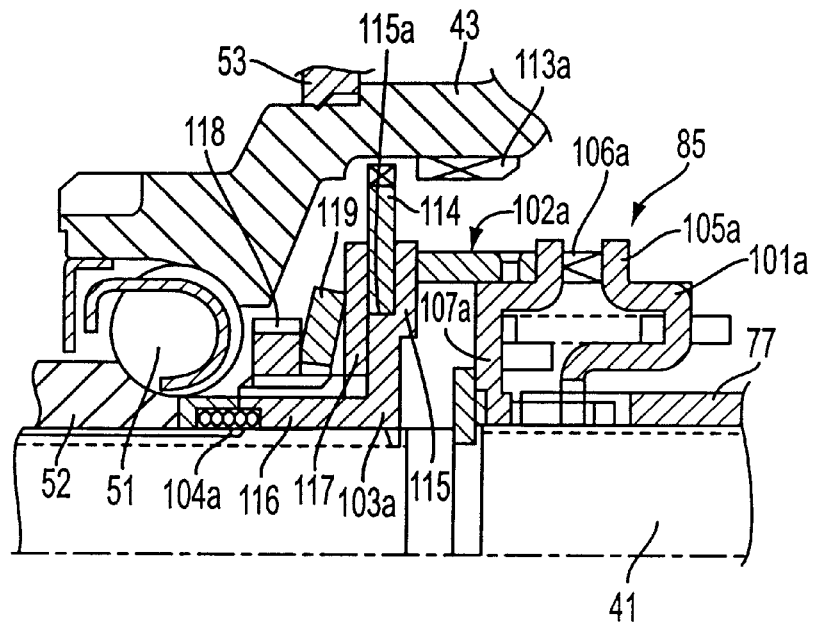
FIG. 18 is a detailed cross-sectional view of a particular embodiment of the antitheft device shown in FIG. 17 when the bicycle is in motion.
Figure 19:
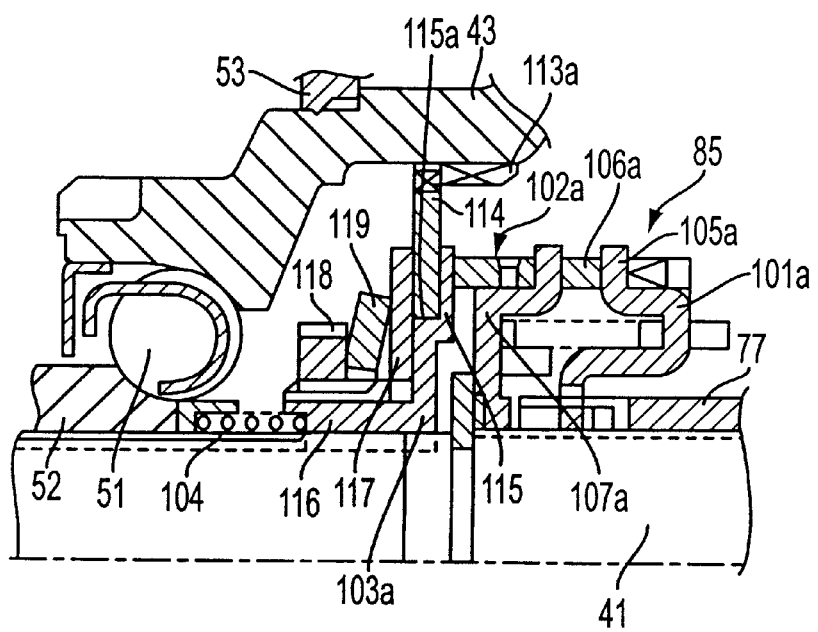
FIG. 19 is a detailed cross-sectional view of the antitheft devce shown in FIG. 17 when the bicycle is in a locked state.
Figure 20A:
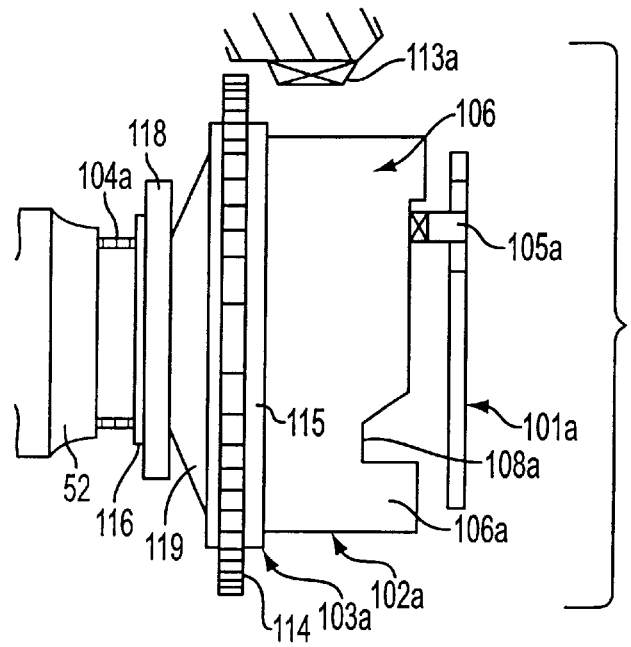
FIGS. 20(a)–20(b) are views showing the operation of the antitheft device of FIG. 17.
Figure 20B:
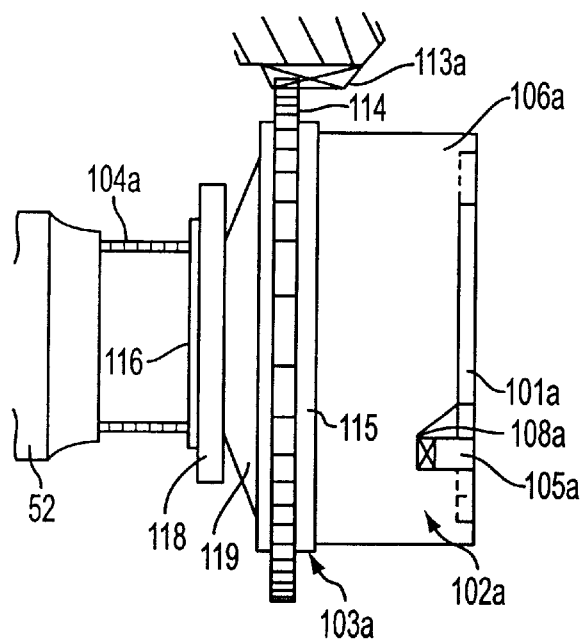

The antitheft device 85 is provided to the left end (in FIG. 17) of the hub axle 41 within the hub shell 43. As shown in FIGS. 18 through 20, the antitheft device 85 has a spring washer 101a that rotates integrally with the sleeve 77, a moving cam 102a, a moving member 103a, a moving spring 104a, and a lock ring 114. The moving cam 102a is nonrotatably installed while allowed to move axially in relation to the hub axle 41. The moving member 103a presses against the moving cam 102a, the moving spring 104a is disposed in a compressed state between the moving member 103a and a hub cone 52, and the lock ring 114 is pressed against the moving member 103a.

The spring washer 101a is a member that is nonrotatably stopped by the sleeve 77, and it has around its outer periphery an engagement tab 105a that strikes the moving cam 102a. The moving cam 102a has a cylindrical cam body 106a and a stopping washer 107a that stops the cam body 106a and the hub axle 41 such that they can move in the axial direction but cannot rotate. A cam component 108a that strikes the engagement tab 105a is formed at the right end (in FIG. 20) of the cam body 106a. The cam component 108a is formed such that the cam body 106a is moved axially to the right by the rotation of the sleeve 77 toward the locked position PK.

Figure 21:
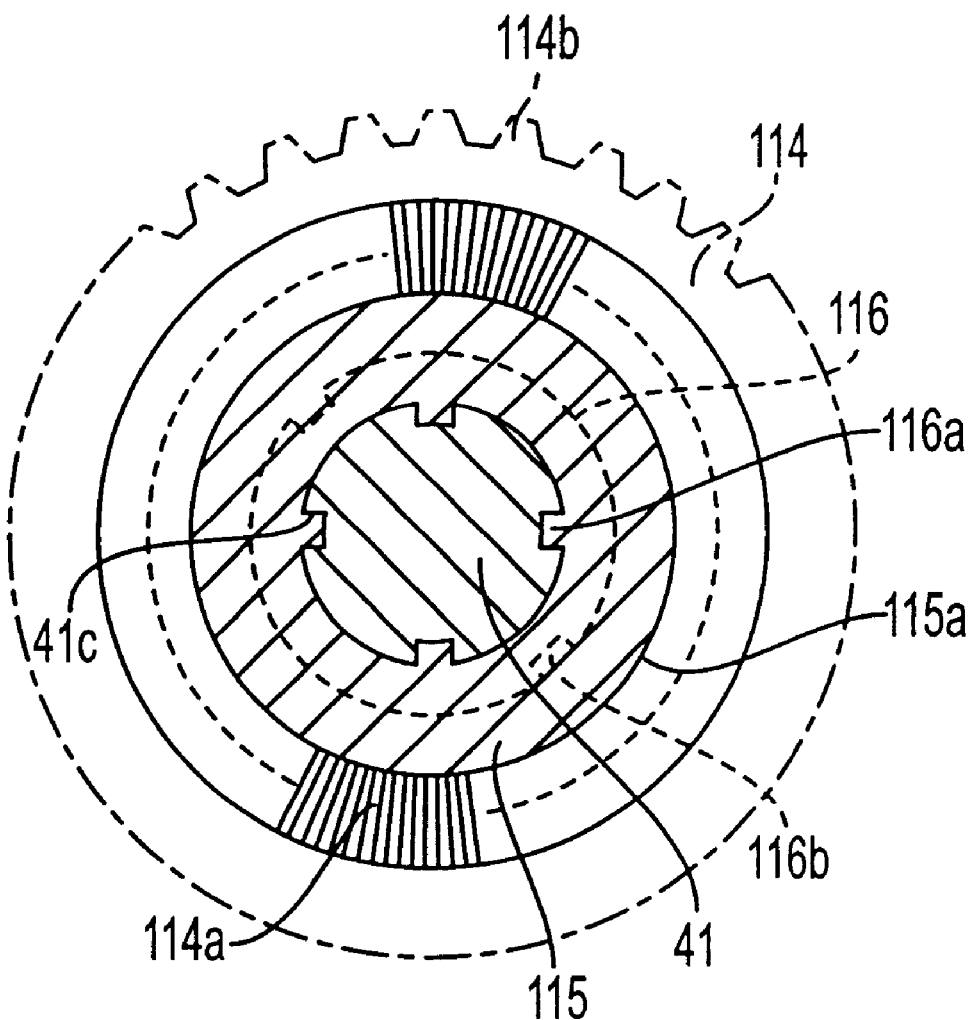
FIG. 21 is a front view of a lock ring used in the antitheft device of FIG. 17.

The moving member 103a has a disk-shaped flange component 115 and a cylindrical component 116 integrally formed along the inner periphery of the flange component 115. A step 115a is formed on the flange component 115 in its midportion as viewed in the radial direction. A lock ring 114 is rotatably supported by the step 115a. As shown in FIG. 21, respective radial irregularities 114a (only those located on the side of the lock ring 114 are shown) are formed on the surface of the flange component 115 facing the lock ring 114 and on the surface of the lock ring 114 facing the flange component 115. The presence of such irregularities 114a increases the frictional force between the lock ring 114 and the moving member 103a and causes these components to vibrate and to produce sound during relative rotation. Serration teeth 114b are formed in the outer peripheral portion of the lock ring 114, as shown in FIG. 21. These serration teeth 114b can engage with serration teeth 113a formed in the inner peripheral surface of the hub shell 43.

Four protrusions 116a are formed on the inner peripheral surface of the cylindrical component 116 as shown in FIG. 21. The protrusions 116a engage four grooves 41c formed in the outer peripheral surface of the hub axle 41. As a result of this arrangement, the moving member 103a is nonrotatably supported by the hub axle 41 while allowed to move in the axial direction. A thread and a stopping groove are formed in the outer peripheral surface of the cylindrical component 116. A pressure ring 117 is mounted around the outside of the cylindrical component 116 as shown in FIG. 18. The pressure ring 117, which is nonrotatably supported on the cylindrical component 116 while allowed to move in the axial direction, is allowed to come into contact with the lock ring 114. In addition, a pressure nut 118 is screwed on the outer periphery at the right end of the cylindrical component 116. A coned disk spring 119 is disposed between the pressure nut 118 and the pressure ring 117.

The pressure exerted by the coned disk spring 119 can be adjusted by adjusting the fastening of the pressure nut 118; the frictional force between the lock ring 114 and the flange component 115 of the moving member 103a can be adjusted via the pressure ring 117; and the rotation of the hub shell 43 can be controlled arbitrarily. For example, maximizing the frictional force produced by the coned disk spring 119 makes it possible to bring the system into a locked state with minimal rotation of the hub shell 43. Furthermore, reducing the frictional force weakens the force with which the rotation of the hub shell 43 is controlled and allows the hub shell 43 to rotate in relation to the hub axle 41. In this case as well, a frictional force is generated when the coned disk spring 119 is energized, and the rotation is controlled, unlike in a free-rotating state. This embodiment allows the rotation of the hub shell 43 (that is, the rotation of the rear wheel 7) to be freely controlled by adjusting the energizing force of the coned disk spring 119 within a range that extends essentially from the locked state to the free-rotating state.

In the antitheft device 85 thus configured, the engagement tab 105a of the spring washer 101a rotating along the sleeve 77 moves into the cam component 108a when the sleeve 77 is rotated from a shift position to the locked position PK. When the engagement tab 105 moves into the cam component 108a, the moving cam 102a and the moving member 103a energized by the moving spring 104a move to the right from the position designated as (A) in FIGS. 18 and 20 to the position designated as (B) in FIGS. 19 and 20. As a result of this, the serration teeth 114b of the lock ring 114 engage with the serration teeth 113a of the hub shell 43, and the rotation of the hub shell 43 is controlled by the force of friction between the lock ring 114 and the moving member 103a. The corresponding frictional force can be altered as needed by adjusting the energizing force of the coned disk spring 119 through the tightening of the pressure nut 118. Therefore, pedaling fails to rotate the rear wheel 7 or rotates it only slightly.

At this time, an attempt to forcefully turn the hub shell 43 results in the relative rotation of the moving member 103a and the lock ring 114 and causes the lock ring 114 and the moving member 103a to vibrate and to emit a loud vibrating noise under the action of the irregularities 114a. Thus, loud noise is produced when the bicycle is pressed by hand or the pedals are pressed and the hub shell 43 is rotated in the locked state, making the bicycle more difficult to steal. Another feature is that even when the sleeve 77 is mistakenly placed in the locked position by an accidental action during riding, the rear wheel 7 is still prevented from being locked abruptly because the rotation of the rear wheel 7 is controlled by friction.

In the first embodiment described above, the sun gears are locked to prevent the bicycle from being pedaled away when the sleeve 77 is in the locked position. However, the bicycle can still be moved by pushing. By contrast, this embodiment entails directly coupling the hub shell 43 with the hub axle 41 to achieve locking. This controls the rotation of the hub shell 43 (and rear wheel 7) even when an attempt is made to push the bicycle, making it more difficult to push the bicycle and reducing the likelihood of a theft.

Figure 22:
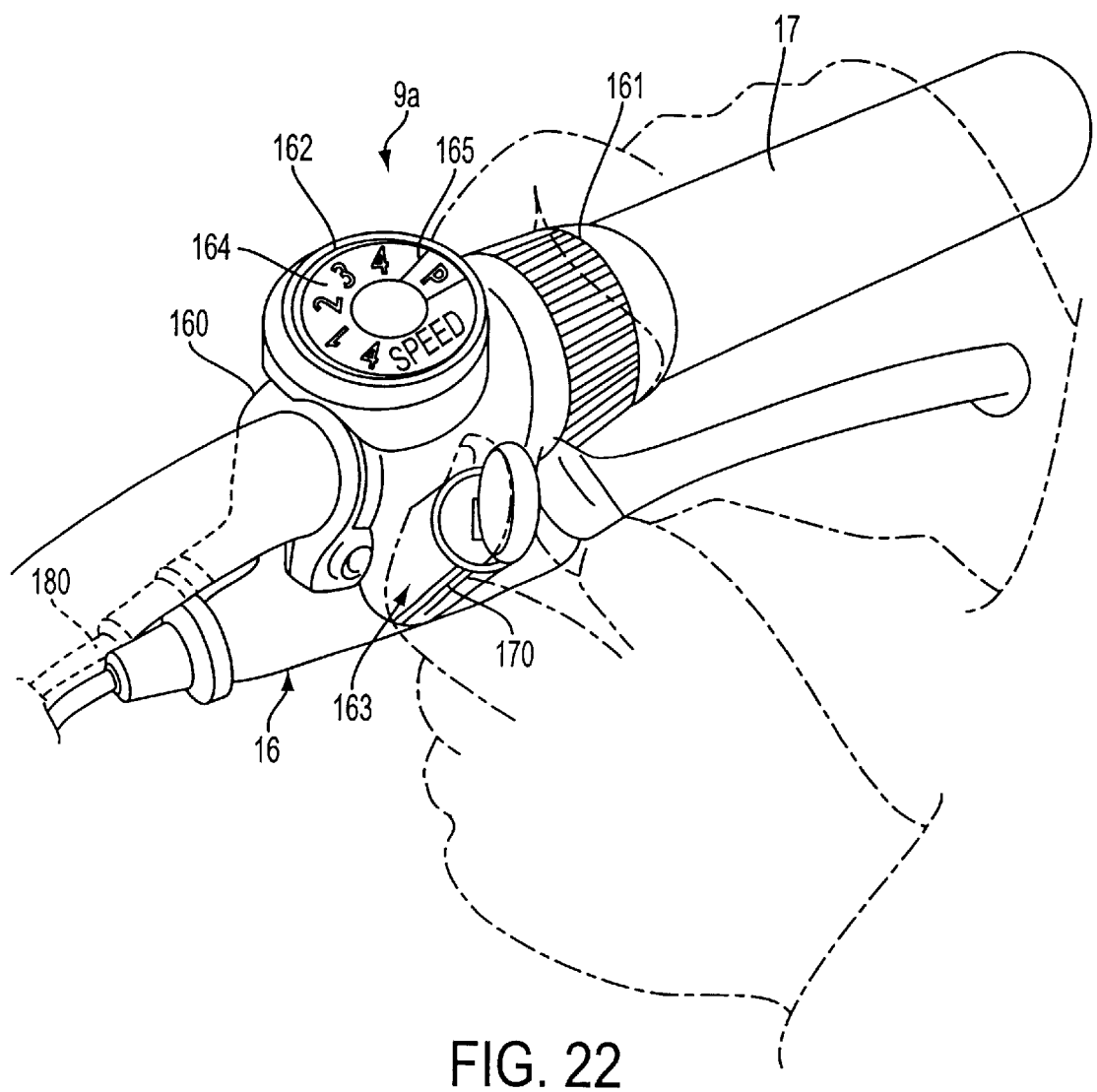
FIG. 22 is an oblique view of an alternative embodiment of a handlebar control mechanism used with an antitheft device according to the present invention.

Although the two embodiments described above referred to internal shifting hubs 10 and 10*a* in which an operator 78 was actuated by a motor, it is also possible to rotate a sleeve and to perform shifting and antitheft locking by linking a shift control element and an operator with the aid of a shifting cable, and by mechanically operating the shift control element. For example, in FIG. 22 the shift control element 9*a* has a body unit 160 formed integrally with the right-side brake lever 16 and a control element 161 rotatably mounted on the body unit 160. The body unit 160 has a circular display component 162 for displaying a shift position or the parking position and a lock component 163 for maintaining the control element 161 in the parking position when this position has been reached.

The display component 162 has a transparent dial 164 on which numbers indicating shift positions 1 through 4 and a letter indicating parking position P are marked at regular intervals in the circumferential direction, and an indicator 165 that rotates in conjunction with the rotation of the control element 161 on the reverse side of the dial 165. The indicator 165 points to one of the five positions comprising a parking position and four shift positions.

As shown in FIG. 23, the lock component 163 has a cylindrical lock 170, a lock cam 171 that rotates in conjunction with the cylindrical lock 170, a lock body 172 actuated by the lock cam 171, and a leaf spring 173 for energizing the lock body 172 to the right in FIG. 23.

Figure 23A:
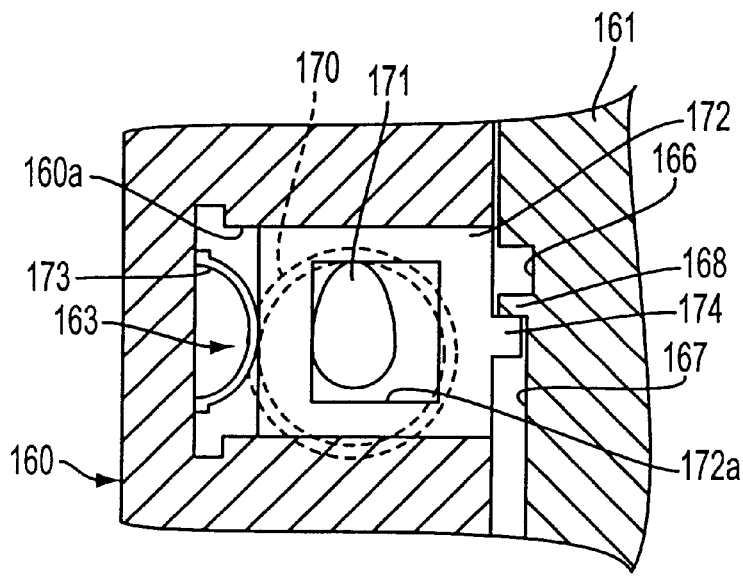
FIGS. 23(a)–23(c) are cross sectional views of a particular embodiment of a locking mechanism used with the handlebar control mechanism shown in FIG. 22.
Figure 23B:
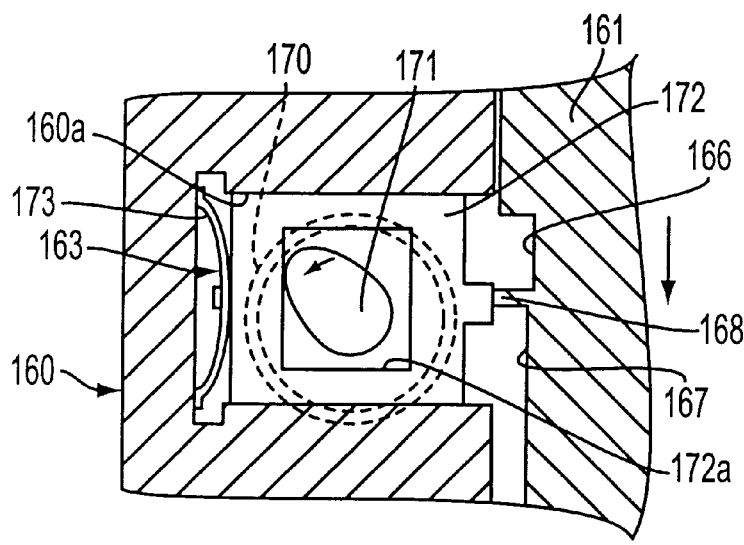
Figure 23C:
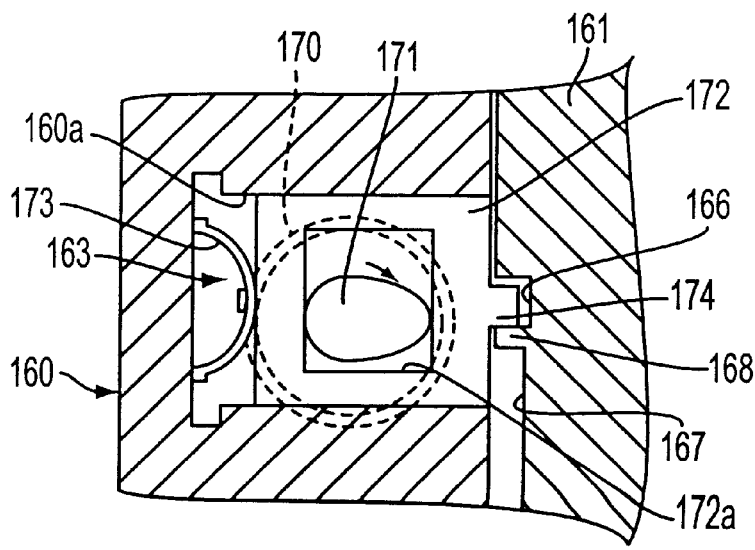

The lock cam 171 is an oval member that is rotated by the rotating cylindrical lock 170, assuming a normal position achieved during shifting and shown in FIG. 23A as a straight-up position, an open position achieved by a 45-degree turn to the left from the normal position and shown in FIG. 23B, and a locked position achieved by a 90-degree turn to the right from the normal position and shown in FIG. 23C.

The lock body 172 is a rectangular member provided with a rectangular opening 172*a* in the center and supported while allowed to move to the left and right in FIG. 23 inside a rectangular opening 160*a* formed within the body unit 160. The outer peripheral surface of the lock cam 171 presses against the inner peripheral surface of the opening 172*a* in the lock body 172. The vertical dimension of the opening 172*a* [is] considerably greater than the lengthwise dimension of the lock cam 171. In addition, the transverse dimension is slightly greater than the medium lengthwise dimension of the lock cam 171 so that the lock body 172 cannot move in any significant way to the right or left when the lock cam 171 is in the locked position. A rectangular stopping protrusion 174 is formed on the lateral surface of the lock body 172 facing the control element 161.

The end face of the control element 161 facing the body unit is provided with a stopping groove 166 that is stopped by the stopping protrusion 174 in the locked position and with a movement groove 167 that faces the stopping protrusion 174 in the normal position. A protrusion 168 between the movement groove 167 and the stopping groove 166 functions as a stopper for preventing the system from leaving a shift position and moving to the parking position in the normal running state even when the control element 161 is actuated by striking the stopping protrusion 174.

The control element 161 is supported by the body unit 160 while allowed to be placed in five positions: a parking position and four shift positions. The shift positions can be changed by the rotation of the control element 161 with the thumb and the index finger. The control element 161 is linked to a cable winder (not shown) provided to the body unit 160, and the inner cable of a shifting cable 180 whose tip is fixed to the cable winder is taken up or paid out by rotation. The tip of the inner cable of the shifting cable 180 is linked to the operator 78.

When the shift control element 9*a* is in the normal position (FIG. 23A), that is, when the cylindrical lock 170 is not engaged, the control element 161 can be turned to one of the four shift positions because the stopping protrusion 174 is positioned in the movement groove 167. When a key is inserted into the cylindrical lock and turned 45 degrees to the left, the lock cam 171 is rotated in the same manner, and the open position is reached. At this time, the lock body 172 is allowed to move to the left in FIG. 23 in opposition to the energizing force of the leaf spring 173 (FIG. 23B). This releases the stopped state formed by the striking of the protrusion 168 and the stopping protrusion 174, and allows the control element 161 to rotate to the parking position. The stopping protrusion 174 faces the stopping groove 166 when the control element 161 is rotated to the parking position. When the key is turned 135 degrees to the right from the open position in this state, the lock cam 171 is rotated in the same manner and is moved to the locked position. At this time, the lock body 172 is moved to the left in FIG. 23 by the energizing force of the leaf spring 173 (FIG. 23C). As a result, the stopping protrusion 174 engages the stopping groove 166, and the control element 161 is nonrotatably locked. The lock cam 171 is maintained in the parking state in the locked position if the key is removed from the cylindrical lock 170 in this state.

Conversely, to release the parking state the key is inserted into the cylindrical lock 170 and turned 135 degrees to the left, placing the lock cam 171 in the open position. When this is done, the lock body is moved to the left, allowing the control element 161 to be rotated. The lock cam 171 is placed in the normal position when the key is turned 45 degrees to the right after the control element 161 has been placed in one of the shift positions. In this state, the lock body 172 is moved to the right by the energizing force of the leaf spring 173, and the stopping protrusion 174 is placed into the movement groove 167. In this state, the control element 161 can move solely among the four shift positions, as described above. As a result, the parking position cannot be engaged even by mistake. In this state, the key is removed and riding is started.

Figure 24:
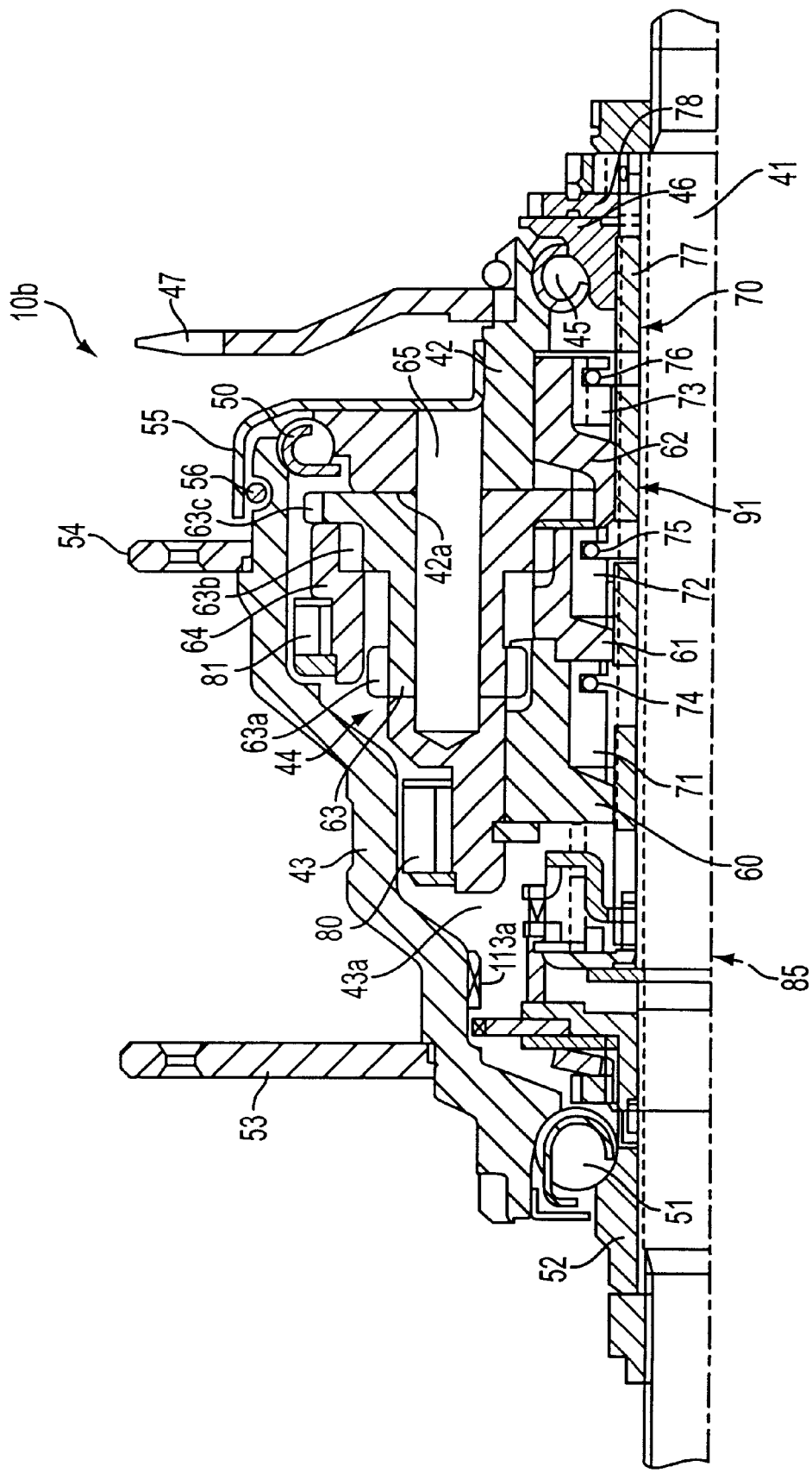
FIG. 24 is a partial cross sectional view of a bicycle hub transmission that incorporates another alternative embodiment of an antitheft device according to the present invention.

As shown in FIG. 24, an internal shifting hub 10*b* has essentially the same structure as the one shown in FIG. 17, the difference being that a shifting cable is directly linked to the operator 78. The embodiment shown in FIG. 17 contemplates an arrangement in which the operator 78 is turned by the motor 29, whereas the embodiment shown in FIG. 24 contemplates an arrangement in which the operator 78 is turned by the shifting cable. In all other respects the structure is the same as in the embodiment shown in FIG. 17, and the corresponding description will therefore be omitted.

This embodiment contemplates an arrangement in which rotating the control element 161 of the shift control element 9*a* into the parking position results in the rotation of the operator 78, in the corresponding rotation of the sleeve 77 to the locked position PK, and in the controlled rotation of the internal shifting hub 10*b* so that a sound is produced when the hub shell 43 is rotated. As a result, the likelihood of a theft is reduced and bicycle theft is prevented in the same manner as in the two embodiments described above. In addition, placing the control element 161 in the parking position makes it possible for this state to be maintained by the cylindrical lock 170, so a return to a shift position is impossible until the cylindrical lock 170 is unlocked. This impedes the unlocking of the antitheft device 85 in the antitheft position and makes theft less likely.

Figure 25:
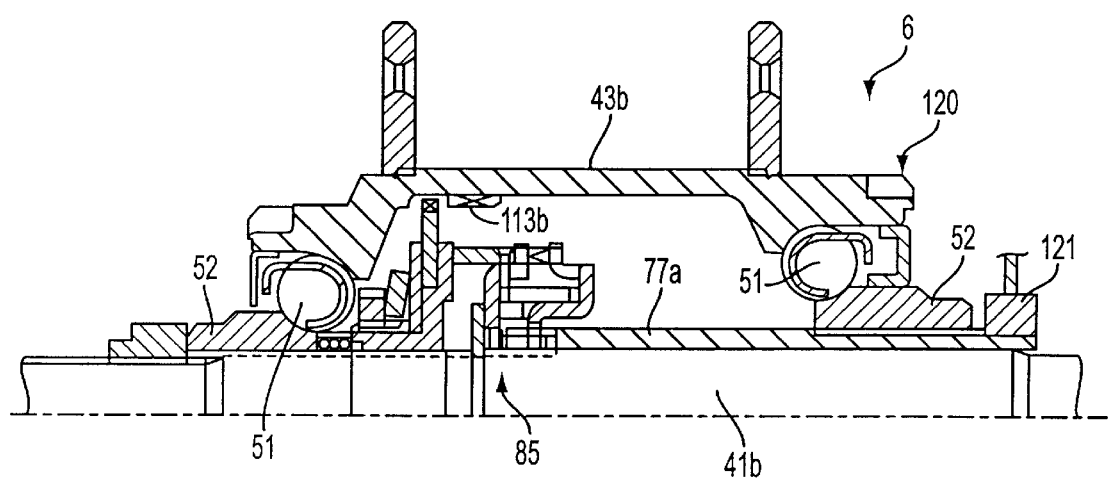
FIG. 25 is a partial cross sectional view of a front hub that incorporates an embodiment of an antitheft device according to the present invention.

Although the three embodiments described above referred to an internal shifting hub 10 for a rear wheel 7, it is also possible to mount the antitheft device 85 inside a front hub 120 for a front wheel 6 as shown in FIG. 25. In this embodiment the front hub 120 has a hub axle 41b and a hub shell 43b rotatably supported on the hub axle 41b. Serration teeth 113b are formed in the inner peripheral surface of the hub shell 43b. A sleeve 77a is rotatably mounted around the outside of the hub axle 41b, and a lock lever 121 is rotatably mounted in the base-end portion of the sleeve 77a. The structure of the antitheft device 85 is the same as in the second embodiment above, and the corresponding description will therefore be omitted.

In this embodiment, a lock control element is disposed, for example, on the handlebar 15. This lock control element may have essentially the same structure as the shift control element 9a. Specifically, the lock control element may be equipped with a body unit and a control element. The control element may move among the parking position and riding positions. These riding positions correspond to the plurality of shift positions. The lock control element is provided with a means that allows a cylindrical lock or the like to be locked with a key in the parking position and that prevents a return from the parking position to a riding position unless a numeric password has been inputted, a key inserted, or another such unlocking operation performed. It is possible to link such a lock control element and the lock lever 121 with the aid of a cable, to allow the lock control element to rotate the sleeve 77a, and to move the moving member between a locked position and an unlocked position.

Figure 26:
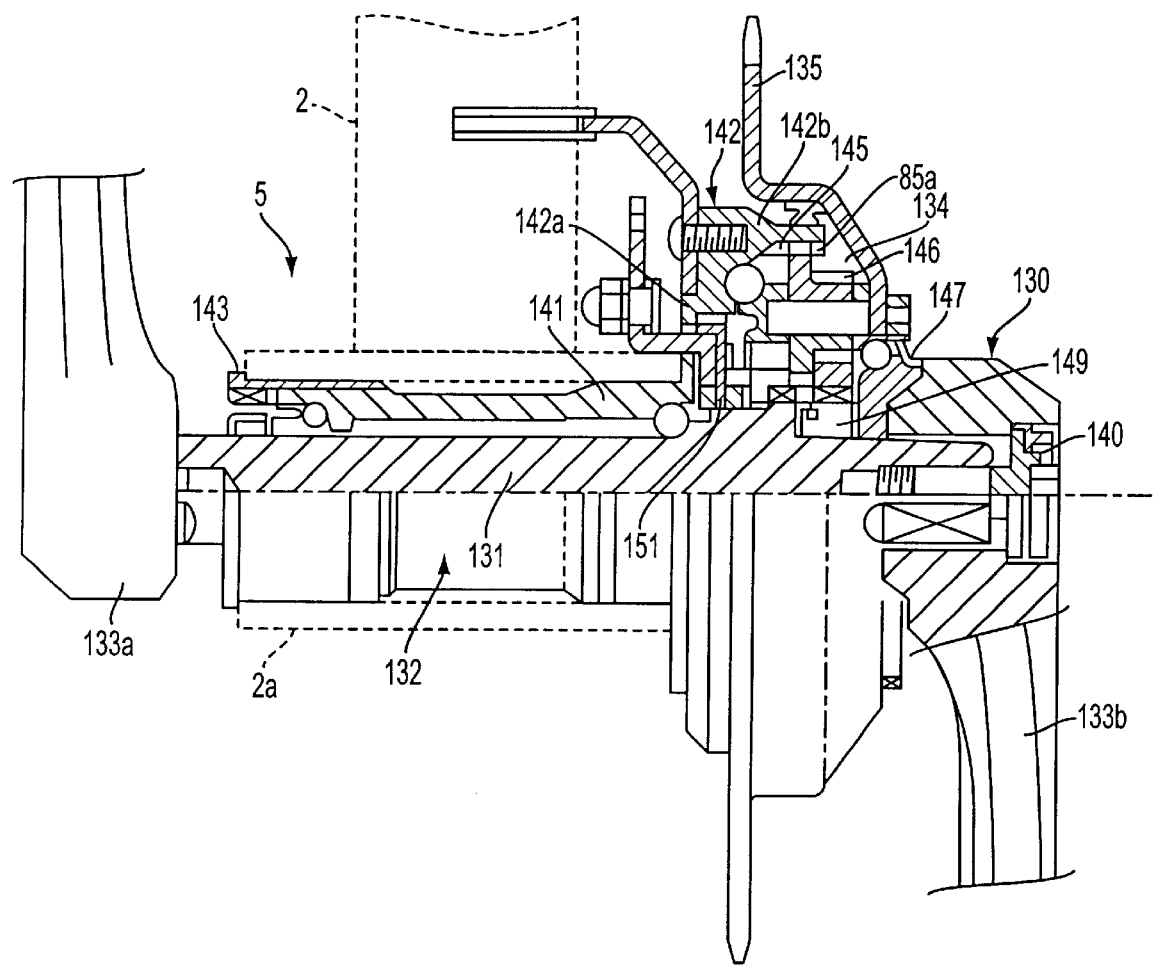
FIG. 26 is a partial cross sectional view of a crank transmission that incorporates an embodiment of an antitheft device according to the present invention.

Although the embodiments described above involved providing a wheel hub with an antitheft device, it is also possible to mount the antitheft device 85a inside the internal shift crank 130 of a drive component 5, as shown in FIG. 26. In this embodiment the internal shift crank 130 can be locked or shifted between two steps (high and low). The internal shift crank 130 has a bottom bracket 132 (which has a crank axle 131 that is mounted on the bottom bracket component 2a of the bicycle frame body 2), left and right crank arms 133a and 133b, a planetary gear mechanism 134, a crank gear 135 linked to the planetary gear mechanism 134, and an antitheft device 85a provided to the planetary gear mechanism 134.

The crank axle 131 is rotatably supported on the cylindrical bottom bracket 132, and the crank arms 133a and 133b are nonrotatably mounted at both ends with the aid of a mounting bolt 140. The bottom bracket 132 has a cylindrical bracket body 141 for supporting the crank axle 131, a case component 142 integrally formed at the right end of the bracket body 141, and an attaching bolt 143 mounted on the left end of the bracket body 141. The bottom bracket 132 is mounted on the bottom bracket component 2a by tightening, with the aid of the attaching bolt 143, the bracket body 141 inserted into the bottom bracket component 2a, and is nonrotatably stopped in relation to the frame body 2 by a fixing arm 144 mounted on the case component 142. The case component 142, which is designed to house the planetary gear mechanism 134 in its interior, has a disk component 142a disposed at the right end of the bracket body 141 and a cylindrical component 142b extending to the right in FIG. 26 away from the outer peripheral portion of the disk component 142a.

Figure 27:
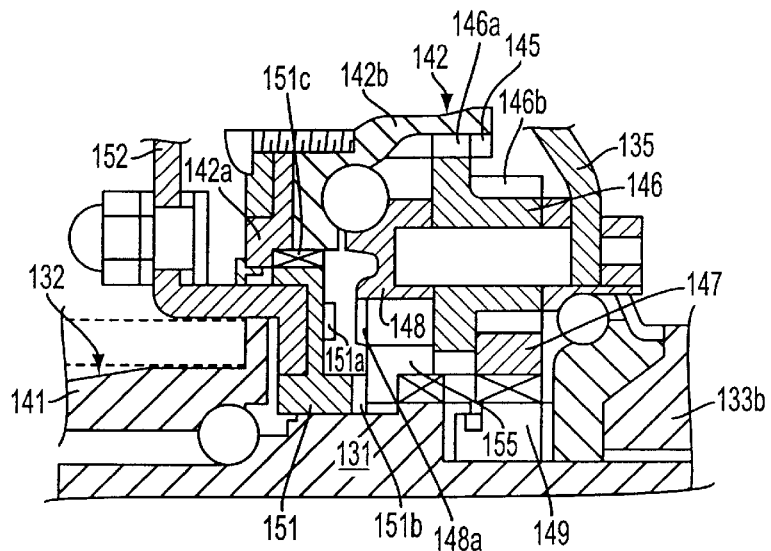
FIGS. 27(a)–27(c) are views showing the operation of the antitheft mechanism of FIG. 26.

As shown in FIG. 27, the planetary gear mechanism 134 has a ring gear 145 formed on the inner peripheral surface of the cylindrical component 142b, three planetary gears 146 (only one is shown in FIG. 27) that mesh with this ring gear 145, and a sun gear 147 that meshes with the planetary gears 146.

The planetary gears 146 are arranged at regular intervals in the circumferential direction around an annular frame body 148 fixed to the crank gear 135, and they are rotatably supported on the frame body 148. The frame body 148 is rotatably supported by a crank arm 133b and the case component 142, and a swingable drive pawl 155 is disposed around the inside of this frame body. Only the forward rotation of the crank axle 131 is transmitted by the drive pawl 155 to the frame body 148.

The frame body 148 can be rotated by the drive pawl 155 only in the forward direction integrally with the crank axle 131. In addition, a large number of stopping grooves 148a are radially formed in the left-side surface of the frame body 148. The planetary gears 146 have a large gear tooth 146a and a small gear tooth 146b. The large gear tooth 146a meshes with the ring gear 145, and the small gear tooth 146b meshes with the sun gear 147. The sun gear 147 is rotatably mounted on the crank axle 131. A drive pawl 149 is disposed inside the sun gear 147, which is rotated by the drive pawl 149 in conjunction solely with the forward rotation of the crank axle 131.

A switching disk 151 is nonrotatably mounted around the inside of the cylindrical component 142b of the case component 142 while allowed to move in the axial direction. The switching disk 151 is axially moved by the turning of a switching lever 152. The switching disk 151 is also energized to the left in FIG. 27 by an energizing means (not shown). The switching lever 152 is swingably supported by the case component 142, an inclined cam (not shown) is formed on the lateral surface that strikes this switching disk 151, and the switching disk 151 is moved in the axial direction by turning. A shifting cable is mounted on the upper end. The shift control element has, for example, three positions (high-speed position, low-speed position, and parking position) and can be locked in the parking position to allow this position to be preserved. This shift control element may be essentially the same as that disclosed in relation to the third embodiment.

A radial stopping groove 151a capable of meshing with the stopping grooves 148a formed in the frame body 148 are formed in the right-side surface of the switching disk 151. Together with the switching disk 151, these stopping grooves 148a and 151a constitute the antitheft device 85a. In addition, a switching pawl 151b designed to turn the drive pawl 155 without driving is formed at the right end around the inside of the switching disk 151. Furthermore, a tooth component 151c for meshing with the cylindrical component 142b is formed around the outside of the switching disk 151.

The crank gear 135 rotates integrally with the frame body 148. The crank gear 135 is rotatably supported by the crank arm 133b and the case component 142 via the frame body 148. When the shift control element is turned to the high-speed position in the internal shift crank 130 thus configured, the switching lever 152 is turned via the shifting cable (as shown in FIG. 27A), and the switching disk 151 is moved to the high-speed position on the left side. In this state, the frame body 148 and the crank axle 131 are linked by the drive pawl 155. As a result, the forward rotation of the crank axle 131 is directly transmitted to the frame body 148, and the crank gear 135 is rotated at the same rotational speed as the crank axle 131.

When the shift control element is turned to the low-speed position, the switching lever 152 is turned via the shifting cable as shown in FIG. 27B, and the switching disk 151 is moved to the low-speed position in the center. In this state, the drive pawl 155 is turned by the switching pawl 151b of the switching disk 151, and the drive pawl 155 cannot perform driving. As a result, the link between the frame body 148 and the crank axle 131 is released. When this is done, the forward rotation of the crank axle 131 is transmitted to the sun gear 147 via the drive pawl 149. When the sun gear 147 is rotated in the forward direction, the planetary gear 146 rotates around its axis in the opposite direction and revolves around the sun gear in the forward direction at a reduced speed. As a result, the crank gear 135 rotates at a reduced speed via the frame body 148.

When the shift control element is turned to the parking position, this state is preserved by the input of a password, the use of a key, or the like. When the shift control element is placed in this parking position, the switching lever 152 is turned via the shifting cable, and the switching disk 151 is placed in the locked position on the right, as shown in FIG. 27C. In this state, the drive pawl 155 is turned by the switching pawl 151b of the switching disk 151, and cannot be driven any longer. In addition, the stopping groove 151a and the stopping grooves 148a engage with each other, and the frame body 148 is linked to the case component 142 and locked via the switching disk 151. Consequently, the crank axle 131 is locked and the crank gear 135 does not rotate when an attempt is made to rotate the crank arms 133a and 133b in the forward direction. When, however, the crank arms 133a and 133b are caused to rotate in the backward direction, the drive pawl 149 disengages from the sun gear 147, and the crank axle 131 is able to rotate even if the frame body 148 has been locked. However, the rotation of the crank axle 131 is not transmitted to the crank gear. Consequently, the bicycle cannot be pedaled away in this locked state, making its theft less likely.

It is also possible for the switching disk to be energized by a suitable energizing means from the left side in FIG. 27, and for the switching disk and the frame body 148 to perform relative rotation in the locked position. In this case, the rotation is controlled, and sound is produced by relative rotation.

Figure 28:
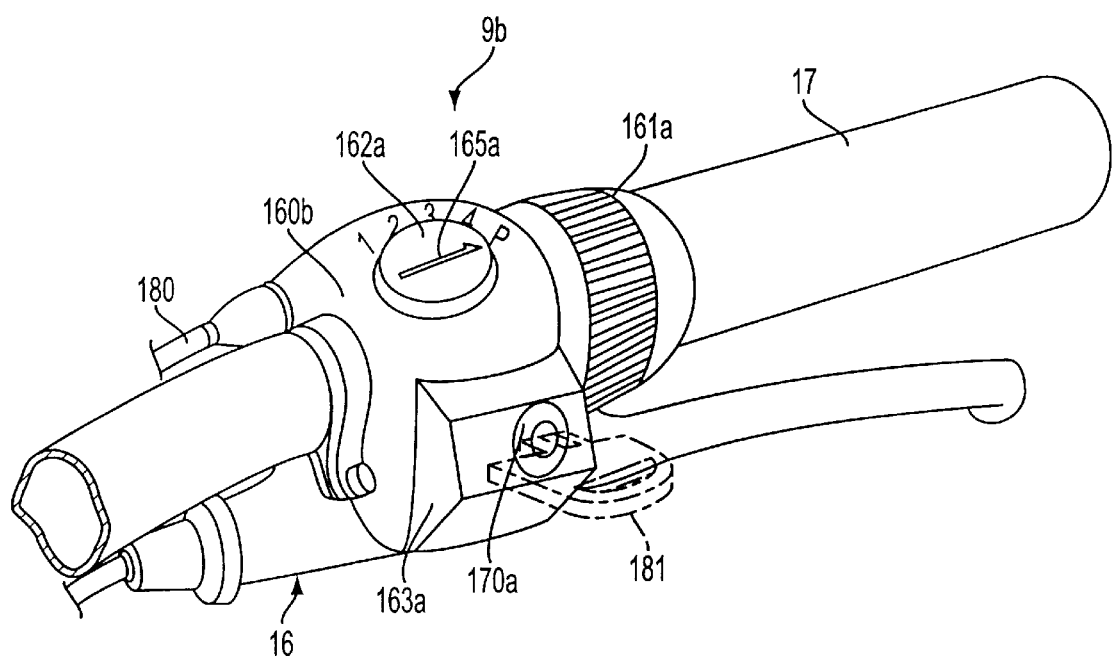
FIG. 28 is an oblique view of another alternative embodiment of a handlebar control mechanism used with an antitheft device according to the present invention.

FIG. 28 depicts another embodiment, which is a modification of the third embodiment described above. In this embodiment, as with the third embodiment, a shift control element 9b is locked in the parking position by a key 181.

In FIG. 28, the shift control element 9b has a body unit 160b formed integrally with the right-side brake lever 16 and a control element 161a rotatably mounted on the body unit 160b. The body unit 160b has a circular display component 162a for displaying a shift position or the parking position and a lock component 163a for maintaining the control element 161a in the parking position when this position has been reached. The display component 162a is rotatably supported on the body unit 160b, and is allowed to rotate in conjunction with the control element 161a. An indicator 165a for displaying [I] numbers indicating the four shift positions 1 through 4 drawn on the body unit 160b and [ii] a letter indicating parking position P is mounted on the surface of the display component 162a. The indicator 165a points to the parking position or to one of the shift positions (four operating positions).

Figure 29:
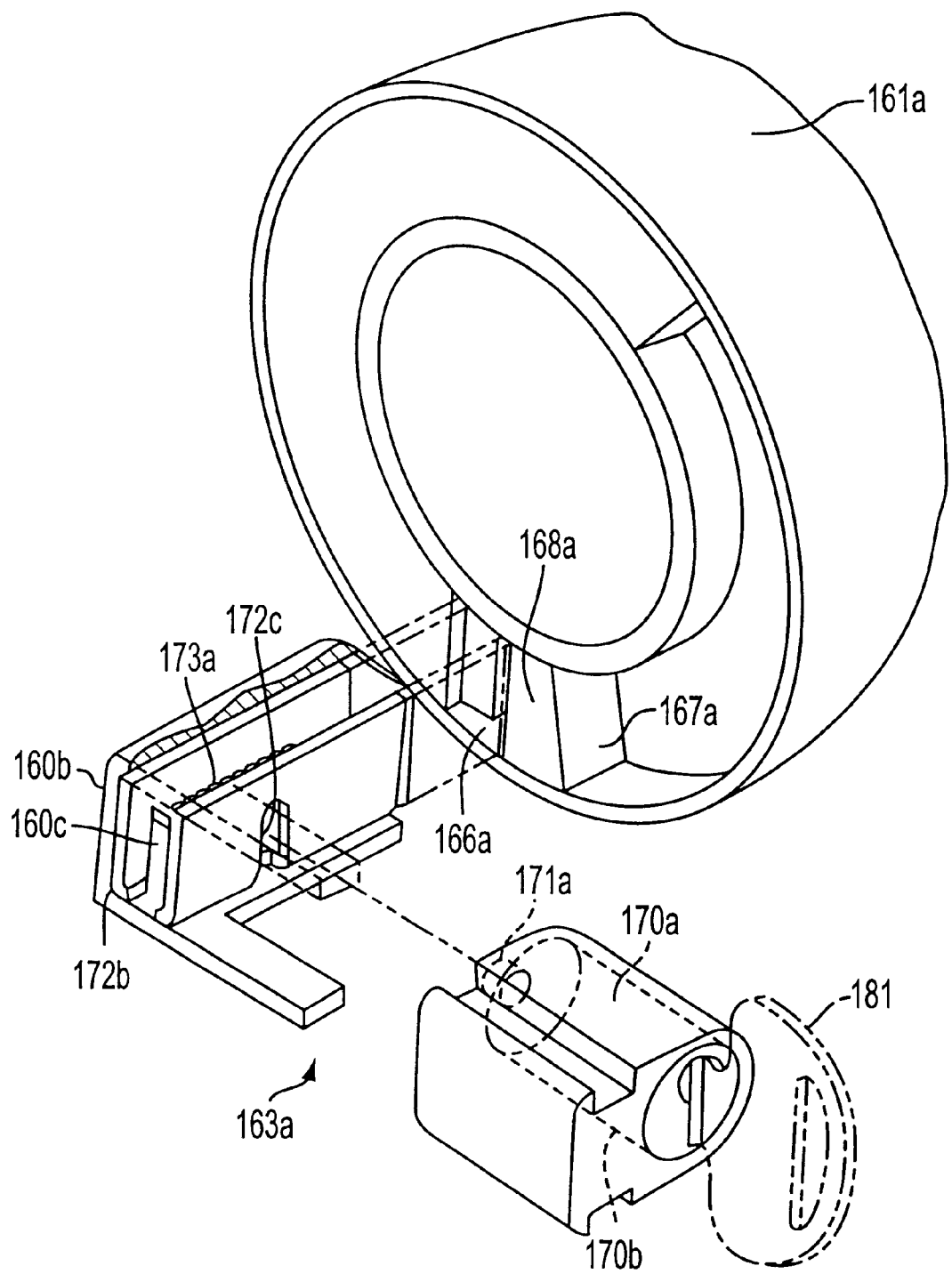
FIG. 29 is an oblique exploded view of a particular embodiment of a lock component used in the handlebar control mechanism shown in FIG. 28.

As shown in FIGS. 29 and 30, the lock component 163a has a cylindrical lock 170a that can be rotated with the key 181, a lock member 172b that moves rectilinearly in conjunction with the cylindrical lock 170a, and a coil spring 173a for energizing the lock member 172b to the right in FIG. 29. The cylindrical lock 170a is used, for example, in a bicycle horseshoe-shaped lock, and contains in its interior a cylindrical component 170b rotatable by the key 181. This cylindrical component 170b can be rotated by the insertion of the key 181 between the first horizontal position shown in FIG. 28 and a second position (shown in FIG. 29) obtained by turning the key 90 degrees counterclockwise from the first position. A protruding pin 171a extends into the back surface (reverse surface in relation to the key-insertion surface) of the cylindrical component 170b of the cylindrical lock 170a.

The lock member 172b, which is a channel steel shape, is supported by the body unit 160b while allowed to move in the axial direction of the handle assembly. A slot 172c for stopping the protruding pin 171a of the cylindrical component 170b is formed in the lateral surface of the lock member 172b facing the cylindrical lock. Due to the stopping of the protruding pin 171a by the slot 172c, the lock member 172b is advanced to or retracted from [I] the forward position shown in FIG. 30A and [ii] the unlocking position shown in FIG. 30B (and reached by retraction from the forward position) by the rotation of the cylindrical component 170b between the first and second positions.

The coil spring 173a, which is stopped by a stopping tab 160c whose base portion is disposed on the body unit 160b and by a stopping tab 172d whose tip is disposed on the lock member 172b, energizes the lock member 172b in the direction of the control element 161a. The end face of the control element 161a that is opposite the body unit 160b is provided with a stopping groove 166a that faces the tip of the lock member 172b when the control element 161a has been moved to the parking position, and with a moving groove 167a that faces the tip of the lock member 172b when the shift positions of gears 1 to 4 have been reached. The stopping groove 166a has a C-shape to enable the tip of the lock member 172b to be stopped in accordance with the parking position, and the moving groove 167a has a fan shape in accordance with the shift positions of gears 1 to 4. A wall component 168a between the moving groove 167a and the stopping groove 166a presses against the tip of the lock member 172b in a normal riding state, and thus functions as a stopper for preventing the system from being switched from a shift position to the parking position or vice versa by the operation of the control element 161a.

The control element 161a is supported by the body unit 160b while allowed to be placed in five positions: four shift positions and a parking position. The operating positions can be changed by the grasping and rotation of the control element 161a with the thumb and the index finger. The control element 161a is linked to a cable winder (not shown) provided to the body unit 160b, and the inner cable of a shifting cable 180 whose tip is fixed to the cable winder is taken up or paid out by rotation. The tip of the inner cable of the shifting cable 180 is linked to the operator 78 of the internal shifting hub 10b (FIG. 24).

Figure 30A:
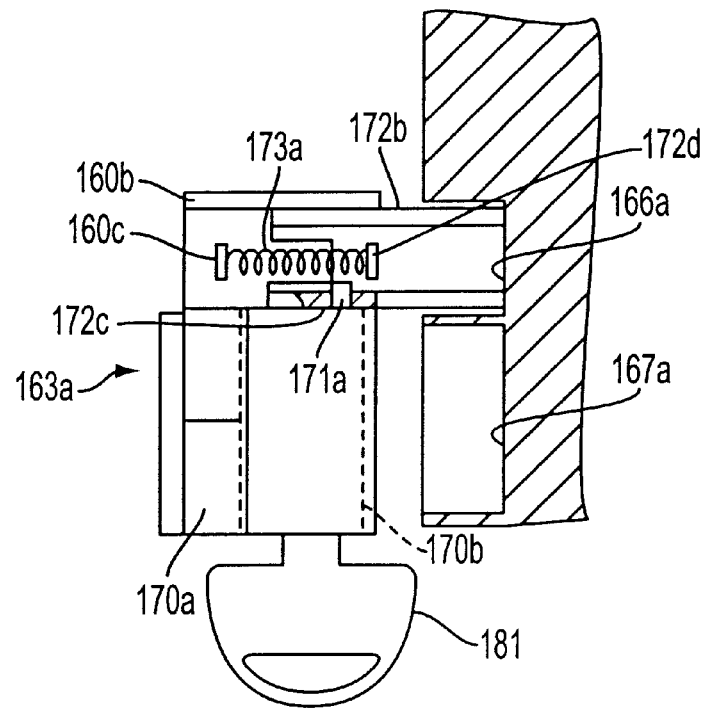
FIGS. 30(a)–30(b) are views showing the operation of the antitheft mechanism of FIG. 29.
Figure 30B:
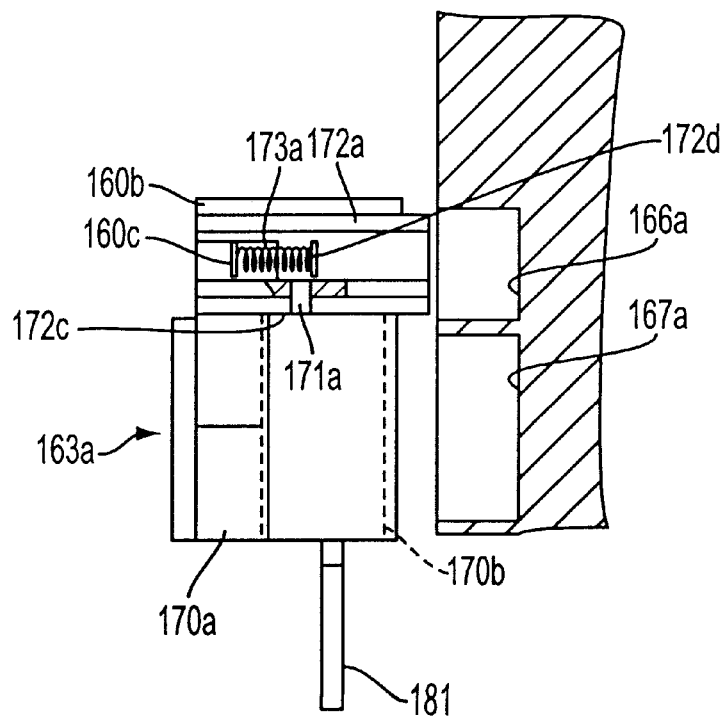

When the key 181 is inserted into the cylindrical lock 170a of the shift control element 9b, the coil spring 173a energizes the lock member 172b in the direction of the control element 161a, so the cylindrical component 170b is also placed in the first position (FIG. 30A). The result of this is that when the control element 161a is placed in one of the four shift positions, the tip of the lock member 172b protrudes into the moving groove 167a, and the control element 161a can be rotated solely among the shift positions of gears 1 to 4. When the control element 161a is in the parking position, the tip of the lock member 172b protrudes into the stopping groove 166a, and the control element 161a is locked in the parking position.

Inserting the key 181 into the cylindrical lock 170a turns the cylindrical component 170b 90 degrees from the first position to the second position (shown in FIG. 30B) when the system is moved from the parking position to a shift position or vice versa. As a result, the lock member 172b retracts in opposition to the energizing force of the coil spring 173a, and the tip of the lock member 172b disengages from the moving groove 167a or the stopping groove 166a. This arrangement allows the control element 161a to be rotated among the shift positions and the parking position. The control element 161a can therefore be moved from the parking position to a shift position or vice versa when, for example, the control element 161a is turned with the right hand while the key 181 is held in the left hand and the cylindrical component 170b is turned to the second position. When the force exerted by the left hand is released after the operation of the control element 161a has been completed, the lock member 172b is advanced by the energizing force of the coil spring 173a, and the cylindrical component 170b turns from the second position to the first position. The tip of the lock member 172b is thus stopped by the moving groove 167a or the stopping groove 166a, and the control element 161a is rotated solely among the four shift positions or is locked in the parking position.

The key 181 is removed from the cylindrical lock 170a in the normal riding state, and the key 181 is inserted into the cylindrical lock 170a (and the cylindrical component 170b is turned from the first position to the shift position) only when the bicycle is locked during parking or is unlocked at the start of riding. This arrangement makes it possible to retract the lock member 172b and to turn the control element 161a from a selected state to the parking state or vice versa. When the control element 161a is turned to the parking position, the operator 78 linked to an inner cable is rotated, the sleeve 77 is turned to the locked position PK in a corresponding manner, the rotation of the internal shifting hub 10b is controlled, and the hub shell 43 rotates and produces sound. As a result, theft can be impeded and bicycle theft prevented in the same manner as in the embodiments described above. In addition, this state is maintained when the control element 161a is placed in the parking position, making a return to a shift position impossible as long as the lock member 172b is not retracted by the cylindrical lock 170a. This impedes the unlocking of the antitheft device 85 in the antitheft position and makes theft less likely.

In addition, the key 181 is not used during riding and should be inserted into the cylindrical lock 170a solely during locking or unlocking, making it possible to keep this key in a key holder together with the bicycle lock key inserted into the lock during riding, and thus reducing the likelihood of the key 181 being lost.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the embodiments described above, the antitheft device was provided to an internal shifting hub, a front hub, or a crank, but the present invention is not limited to these options alone, and the antitheft device may be provided to any component as long as this component can rotate during riding. Four-step gear shifters were used in the embodiments described above, but the gear shifter having a plurality of speed steps also encompasses continuously variable gear shifters. Thus, the scope of the invention should not be limited by the specific structures disclosed. Instead, the true scope of the invention should be determined by the following claims.

What is claimed is:

1. A bicycle antitheft device comprising:
   an antitheft mechanism switchable between an antitheft state and a release state;
   wherein the antitheft mechanism includes:
      a rotatable first member that moves relative to a second member to shift a bicycle transmission; and
      a movement controlling mechanism that hinders the first member from rotating relative to the second member when the antitheft mechanism is in the antitheft state; and
      a selection mechanism for selecting one of the antitheft state and the release state; and
      wherein the first member is structured for surrounding a bicycle handlebar for rotation around the bicycle handlebar.

2. The device according to claim 1 wherein the first member comprises a rotatable shift control device that is rotatable among a plurality of shift positions and to a locking position, wherein the movement controlling mechanism comprises a lock member that can be moved by a key between a shift control device engaging position and a shift control device disengaging position, and wherein the shift control device is prevented from rotating to any of the plurality of shift positions when the shift control device is in the locking position and the lock member is in the shift control device engaging position.

3. The device according to claim 2 further comprising a biasing mechanism for biasing the lock member toward the shift control device engaging position.

4. The device according to claim 2 wherein the shift control device is allowed to rotate to any of the plurality of shift positions when the shift control device is in any of the plurality of shift positions and the lock member is in the shift control device engaging position.

5. The device according to claim 4 wherein the shift control device is prevented from rotating into the locking position when the shift control device is in any of the plurality of shift positions and the lock member is in the shift control device engaging position.

6. The device according to claim 1 wherein the first member comprises an annular member.

7. A bicycle antitheft control device for controlling the operation of a remotely located bicycle antitheft device that is switchable between an antitheft state and a release state, the control device comprising:
   a mounting member adapted to mount to a bicycle handlebar;
   a transmission speed step selection mechanism disposed on the mounting member for selecting a speed step of a bicycle transmission;
   an antitheft selection mechanism disposed on the mounting member for selecting one of the antitheft state and the release state; and
   a selection maintenance mechanism for maintaining the selection of the antitheft state after the antitheft state is selected by the antitheft selection mechanism.

8. The device according to claim 7 wherein the transmission speed step selection mechanism comprises a member structured for surrounding a bicycle handlebar for rotation around the bicycle handlebar.

9. The device according to claim 7 wherein the antitheft selection mechanism comprises a button.

10. The device according to claim 7 wherein the antitheft selection mechanism comprises a dial.

11. The device according to claim 7 further comprising a display for indicating an operating state selected by the antitheft selection mechanism.

12. The device according to claim 11 wherein the operating state comprises the antitheft state and the release state.

13. The device according to claim 11 wherein the display also indicates a speed stage of the bicycle transmission.

14. The device according to claim 8 wherein the member comprises an annular member.

* * * * *